United States Patent
Dou et al.

(10) Patent No.: US 10,771,220 B2
(45) Date of Patent: *Sep. 8, 2020

(54) UPLINK SOUNDING SIGNAL TRIGGERING METHOD AND SYSTEM, AND APPARATUS

(71) Applicant: Huawei Technologies Co., Ltd., Shenzhen (CN)

(72) Inventors: Shengyue Dou, Shanghai (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/684,176

(22) Filed: Nov. 14, 2019

(65) Prior Publication Data

US 2020/0169366 A1 May 28, 2020

Related U.S. Application Data

(63) Continuation of application No. 16/246,077, filed on Jan. 11, 2019, now Pat. No. 10,498,510, which is a (Continued)

(30) Foreign Application Priority Data

Nov. 18, 2015 (CN) .......................... 2015 1 0800172

(51) Int. Cl.
*H04L 5/00* (2006.01)
*H04W 72/04* (2009.01)
*H04W 76/27* (2018.01)

(52) U.S. Cl.
CPC .......... *H04L 5/0048* (2013.01); *H04L 5/0051* (2013.01); *H04W 72/042* (2013.01); (Continued)

(58) Field of Classification Search
CPC ... H04L 5/0048; H04L 5/0051; H04L 5/0037; H04L 5/0053; H04L 5/0091; H04W 72/0413; H04W 72/042; H04W 76/27
See application file for complete search history.

(56) References Cited

U.S. PATENT DOCUMENTS

| | | |
|---|---|---|
| 7,873,710 B2 | 1/2011 | Kiley et al. |
| 2010/0074205 A1 | 3/2010 | Papasakellariou et al. |

(Continued)

FOREIGN PATENT DOCUMENTS

| | | |
|---|---|---|
| CN | 101917765 A | 12/2010 |
| CN | 102075274 A | 5/2011 |

(Continued)

OTHER PUBLICATIONS

3rd Generation Partnership Project; Technical Specification Group Radio Access Network; Evolved Universal Terrestrial Radio Access (E-UTRA); Multiplexing and channel coding (Release 11), 3GPP TS 36.212 V11.3.0, pp. 1-84, 3rd Generation Partnership Project, Valbonne, France (Jun. 2013).

(Continued)

*Primary Examiner* — Ian N Moore
*Assistant Examiner* — Brian T Le
(74) *Attorney, Agent, or Firm* — Leydig, Voit & Mayer, Ltd.

(57) ABSTRACT

An uplink sounding signal triggering method, system, and apparatus are provided to support a sounding reference signal (SRS) group scheduling or SRS switching function. The method includes: sending, by a base station, a downlink control information (DCI) using a physical downlink control channel (PDCCH), with the DCI including a sounding reference signal SRS control information intended for each UE of Y number of UEs, with Y comprising a positive integer greater than 1.

20 Claims, 12 Drawing Sheets

Related U.S. Application Data continuation of application No. 15/983,518, filed on May 18, 2018, now Pat. No. 10,218,480, which is a continuation of application No. PCT/CN2016/106161, filed on Nov. 16, 2016.

(52) U.S. Cl.
CPC ....... *H04W 72/0413* (2013.01); *H04W 76/27* (2018.02); *H04L 5/0037* (2013.01); *H04L 5/0053* (2013.01); *H04L 5/0091* (2013.01)

(56) References Cited

U.S. PATENT DOCUMENTS

| | | |
|---|---|---|
| 2012/0252474 A1 | 10/2012 | Tiirola et al. |
| 2013/0028138 A1 | 1/2013 | Hao et al. |
| 2013/0058306 A1 | 3/2013 | Noh et al. |
| 2013/0250893 A1 | 9/2013 | Li et al. |
| 2013/0294400 A1 | 11/2013 | Liu |
| 2014/0003262 A1 | 1/2014 | He et al. |

FOREIGN PATENT DOCUMENTS

| | | |
|---|---|---|
| CN | 102083033 A | 6/2011 |
| CN | 102469607 A | 5/2012 |
| CN | 102469613 A | 5/2012 |
| CN | 102638325 A | 8/2012 |
| CN | 102668437 A | 9/2012 |
| CN | 103096346 A | 5/2013 |
| CN | 103312444 A | 9/2013 |
| CN | 103369654 A | 10/2013 |
| EP | 2770785 A1 | 8/2014 |
| RU | 2521093 C2 | 6/2014 |
| WO | 2012063131 A1 | 5/2012 |

OTHER PUBLICATIONS

"3rd Generation Partnership Project; Technical Specification Group Radio Access Network; Evolved Universal Terrestrial Radio Access (E-UTRA); Physical channels and modulation (Release 12)," 3GPP TS 36.211, V12.7.0, 1-136, 3rd Generation Partnership Project, Valbonne, France (Sep. 2015).

"3rd Generation Partnership Project; Technical Specification Group Radio Access Network; Evolved Universal Terrestrial Radio Access (E-UTRA); Multiplexing and channel coding (Release 12)," 3GPP TS 36.212 V12.6.0, pp. 1-95, 3rd Generation Partnership Project, Valbonne, France (Sep. 2015).

3rd Generation Partnership Project; Technical Specification Group Radio Access Network; Evolved Universal Terrestrial Radio Access (E-UTRA); Physical layer procedures (Release 12), 3GPP TS 36.213 V12.7.0, pp. 1-241, 3rd Generation Partnership Project, Valbonne, France (Sep. 2015).

"Channel sounding enhancements for LTE-Advanced," 3GPP TSG RAN WG1 Meeting #59bis, R1-100337, Nokia Siemens Networks, Nokia, pp. 1-3, 3rd Generation Partnership Project, Valbonne, France (Jan. 18-22, 2020).

"Final details of SRS," 3GPP TSG RAN WG1 meeting #64, R1-110626,Taipei, Huawei, HiSilicon, pp. 1-4, 3rd Generation Partnership Project, Valbonne, France (Feb. 21-25, 2011).

"On remaining details of dynamic aperiodic SRS triggering," 3GPP TSG RAN WG1 Meeting #63, R1-106291, Jacksonville, USA, Motorola, pp. 1-5, 3rd Generation Partnership Project, Valbonne, France (Nov. 15-19, 2010).

"Aperiodic SRS for LTE-A," 3GPP TSG RAN1#60bis, Beijing, China, XP050419679, R1-102114, Motorola, pp. 1-2, 3rd Generation Partnership Project, Valbonne, France (Apr. 12-16, 2010).

"Further Discussions on Aperiodic SRS of Rel-10 [online]," 3GPP TSG-RAN WG1#62, R1-104548, Mediatek Inc., pp. 1-3, 3rd Generation Partnership Project, Valbonne, France (Aug. 27, 2010).

"PDCCH Common Search Space on SCG [online]," 3GPP TSG-RAN WG1#78, R1-143073, Samsung, pp. 1-2, 3rd Generation Partnership Project, Valbonne, France (Aug. 22, 2014).

"On dynamic aperiodic SRS in LTE-A [online]," 3GPP TSG-RAN WG1#62, R1-104676, ZTE, pp. 1-5, 3rd Generation Partnership Project, Valbonne, France (Aug. 27, 2010).

U.S. Appl. No. 16/246,077, filed Jan. 11, 2019.
U.S. Appl. No. 15/983,518, filed May 18, 2018.

ional Application No. PCT/CN2016/106161, filed on Nov. 16, 2016, which claims priority to Chinese Patent No. 201510800172.1, filed on Nov. 18, 2015. All of the aforementioned applications are hereby incorporated by reference in their entireties.

UPLINK SOUNDING SIGNAL TRIGGERING METHOD AND SYSTEM, AND APPARATUS

CROSS-REFERENCE TO RELATED APPLICATIONS

This application is a continuation of U.S. patent application Ser. No. 16/246,077, filed on Jan. 11, 2019, which is a continuation of U.S. patent application Ser. No. 15/983,518, filed on May 18, 2018, now U.S. Pat. No. 10,218,480, which is a continuation of International Application No. PCT/CN2016/106161, filed on Nov. 16, 2016, which claims priority to Chinese Patent No. 201510800172.1, filed on Nov. 18, 2015. All of the aforementioned applications are hereby incorporated by reference in their entireties.

TECHNICAL FIELD

The present invention relates to the wireless communications field, and in particular, to an uplink channel sounding method and system, and an apparatus.

BACKGROUND

In an uplink of a wireless communications system, because a radio channel is characterized by frequency selective fading, a base station 110 (BS 110) needs to schedule a user equipment (UE), so that the UE can perform data transmission on a frequency band with relatively good channel quality, obtain a frequency selective gain, and ensure uplink performance.

The BS 110 configures the UE to transmit a sounding reference signal (SRS) for estimating uplink channel quality. Then the BS 110 performs frequency selective scheduling for uplink data transmission of the UE according to detected channel state information (CSI).

In an existing Long Term Evolution (LTE) protocol, the UE sends an SRS based on two trigger mechanisms: a trigger type 0, or a trigger type 1. The trigger type 0 corresponds to periodic SRS transmission, and results in the triggering being performed using higher layer radio resource control (RRC) signaling. The trigger type 1 corresponds to aperiodic SRS transmission, and results in the triggering being performed using downlink control information (DCI) of a physical downlink control channel (PDCCH) or an enhanced physical downlink control channel (ePDCCH).

However, for the existing aperiodic SRS transmission, a DCI of a PDCCH or ePDCCH can be used to configure only one UE to send an SRS once. When an SRS needs to be rapidly configured for a plurality of UEs in a short time in the wireless communications system, the system has relatively large signaling overhead.

SUMMARY

An uplink sounding signal triggering method. The method comprises sending, by a base station, a downlink control information (DCI) using a physical downlink control channel (PDCCH), with the DCI including a sounding reference signal (SRS) control information intended for each user equipment (UE) of Y number of UEs, with Y comprising a positive integer greater than 1.

An uplink sounding signal triggering method is provided. The method comprises receiving, by a user equipment (UE), a downlink control information (DCI) from a base station, with the DCI including a sounding reference signal (SRS) control information intended for each UE of Y number of UEs, and with Y comprising a positive integer greater than 1. The method further comprises triggering, by the UE after detecting that the DCI comprises SRS control information intended for the UE, an SRS transmission according to the SRS control information intended for the UE.

A user equipment (UE) is provided, comprising a memory storage comprising instructions. The UE further comprises a communication interface receiving a downlink control information (DCI) from a base station, with the DCI comprising a sounding reference signal (SRS) control information intended for each UE of Y number of UEs, and with Y comprising a positive integer greater than 1. The UE further comprises a processor in communication with the memory and the communication interface, wherein the processor executes the instructions to trigger, after detecting that the DCI comprises SRS control information intended for the UE, an SRS transmission according to the SRS control information intended for the UE.

To achieve the foregoing objective, the following technical solutions are provided in the embodiments of the present invention:

According to a first aspect, an uplink sounding signal triggering method is provided, where the method includes: sending, by a base station, a downlink control information DCI by using a physical downlink control channel, where the DCI includes sounding reference signal SRS control information intended for each of Y number of user equipments UEs in a cell managed by the base station, and Y is a positive integer not less than 2.

In the uplink sounding signal triggering method provided in this embodiment of the present invention, the DCI sent by the base station by using the physical downlink control channel includes the SRS control information intended for each of the Y number of UEs in the cell managed by the base station, and Y is a positive integer not less than 2. That is, the DCI in this embodiment of the present invention can be used to trigger a plurality of UEs to send an SRS once. Therefore, when an SRS needs to be rapidly configured for a plurality of UEs in a short time in a wireless communications system, signaling overheads of a physical layer PDCCH/ePDCCH can be reduced.

According to a second aspect, an uplink sounding signal triggering method is provided, where the method includes: receiving, by user equipment UE, a downlink control information DCI sent by a base station, where the DCI includes sounding reference signal SRS control information intended for each of Y number of user equipments UEs in a cell managed by the base station, and Y is a positive integer not less than 2; and triggering, by the UE after detecting that the DCI includes SRS control information intended for the UE, an SRS according to the SRS control information intended for the UE.

In the uplink sounding signal triggering method provided in this embodiment of the present invention, the DCI sent by the base station by using the physical downlink control channel includes the SRS control information intended for each of the Y number of UEs in the cell managed by the base station, and Y is a positive integer not less than 2. That is, the DCI in this embodiment of the present invention can be used to trigger a plurality of UEs to send an SRS once. Therefore, when an SRS needs to be rapidly configured for a plurality of UEs in a short time in a wireless communications system, signaling overheads of a physical layer PDCCH/ePDCCH can be reduced. Further, after detecting that the DCI includes the SRS control information intended for the UE, the UE may trigger an SRS according to the SRS control information intended for the UE. That is, a difference from a periodic SRS trigger mechanism in the prior art lies in that, in this embodiment of the present invention, regardless of a periodic SRS or an aperiodic SRS, the SRS is triggered by using the DCI. DCI-based configuration is dynamic configuration, and the SRS can be reconfigured or the configuration can be stopped in a timely manner. Therefore, a flexible configuration requirement can be met.

According to a third aspect, a base station is provided, where the base station includes a sending unit; and the sending unit is configured to send a downlink control information DCI by using a physical downlink control channel, where the DCI includes sounding reference signal SRS control information intended for each of Y number of user equipments UEs in a cell managed by the base station, and Y is a positive integer not less than 2.

The base station in this embodiment of the present invention may be configured to perform the uplink sounding signal triggering method in the first aspect. Therefore, for technical effects that can be achieved by the base station, refer to the technical effects of performing the uplink sounding signal triggering method by the base station in the first aspect. Details are not described herein again.

According to a fourth aspect, user equipment UE is provided, where the UE includes a receiving unit and a processing unit;

the receiving unit is configured to receive a downlink control information DCI sent by a base station, where the DCI includes sounding reference signal SRS control information intended for each of Y number of user equipments UEs in a cell managed by the base station, and Y is a positive integer not less than 2; and the processing unit is configured to trigger, after it is detected that the DCI includes SRS control information intended for the UE, an SRS according to the SRS control information intended for the UE.

The UE in this embodiment of the present invention may be configured to perform the uplink sounding signal triggering method in the second aspect. Therefore, for technical effects that can be achieved by the UE, refer to the technical effects of performing the uplink sounding signal triggering method by the UE in the second aspect. Details are not described herein again.

Optionally, in any one of the first aspect to the fourth aspect, a bit quantity of SRS control information intended for $i^{th}$ UE in the Y number of UEs is $k_i$, $1 \leq i \leq Y$, i is an integer, and $k_i$ is a positive integer not less than 1.

In this embodiment of the present invention, for different application scenarios, $2^{k_i}$ combination states represented by $k_i$ bits in the SRS control information intended for the $i^{th}$ UE are corresponding to different indication manners, and some indication manners provided as examples are as follows:

In a first possible implementation, $s_i$ combination states in the $2^{k_i}$ combination states represented by the $k_i$ bits in the SRS control information intended for the $i^{th}$ UE are separately used to indicate a set of SRS parameters required when the UE aperiodically sends an SRS, and one of combination states other than the $s_i$ combination states in the $2^{k_i}$ combination states is used to instruct the UE to not send an SRS, where $1 \leq s_i \leq 2^{k_i}-1$, and $s_i$ is an integer.

In a second possible implementation, one of the $k_i$ bits in the SRS control information intended for the $i^{th}$ UE is used to instruct the UE to periodically or aperiodically send an SRS, $s_i$ combination states in $2^{k_i-1}$ combination states represented by other ($k_i-1$) bits in the $k_i$ bits are separately used to indicate a set of SRS parameters required when the UE periodically or aperiodically sends an SRS, and one of combination states other than the $s_i$ combination states in the $2^{k_i-1}$ combination states is used to instruct the UE to not send an SRS, where $1 \leq s_i \leq 2^{k_i-1}-1$, $s_i$ is an integer, and $k_i$ is a positive integer greater than 1.

In a third possible implementation, $s_i$ combination states in the $2^{k_i}$ combination states represented by the $k_i$ bits in the SRS control information intended for the $i^{th}$ UE are separately used to indicate a set of SRS parameters required when the UE periodically sends an SRS, and one of combination states other than the $s_i$ combination states in the $2^{k_i}$ combination states is used to instruct the UE to not send an SRS, where $1 \leq s_i \leq 2^{k_i}-1$, and $s_i$ is an integer.

Certainly, alternatively, the $2^{k_i}$ combination states represented by the $k_i$ bits may be corresponding to another indication manner, and the foregoing indication manners are merely examples for description. This is not specifically limited in this embodiment of the present invention. In addition, a same indication manner may have different representation forms. For example, in the second possible implementation, another indication manner may be used for representation, that is, $2^{k_i-1}$ combination states in the $2^{k_i}$ combination states represented by the $k_i$ bits in the SRS control information intended for the $i^{th}$ UE are used to instruct the UE to periodically send an SRS, $s_i$ combination states in the $2^{k_i-1}$ combination states are respectively used to indicate $s_i$ sets of periodic SRS parameters required when the UE periodically sends an SRS, and one of combination states other than the $s_i$ combination states in the $2^{k_i-1}$ combination states is used to instruct the UE to not send an SRS, where $0 \leq s_i \leq 2^{k_i-1}-1$, $s_i$ is an integer, and $k_i$ is a positive integer greater than 1; and $2^{k_i-1}$ combination states other than the $2^{k_i-1}$ combination states in the $2^{k_i}$ combination states are used to instruct the UE to aperiodically send an SRS, $t_i$ combination states in the $2^{k_i-1}$ combination states are respectively used to indicate $t_i$ sets of aperiodic SRS parameters required when the UE aperiodically sends an SRS, and one of combination states other than the $t_i$ combination states in the $2^{k_i-1}$ combination states is used to instruct the UE to not send an SRS, where $0 \leq t_i \leq 2^{k_i-1}-1$, and $t_i$ is an integer.

A representation form of the indication manner in the second possible implementation is not specifically limited in this embodiment of the present invention.

Optionally, with reference to the first possible implementation, in the second aspect, the triggering, by the UE, an SRS according to the SRS control information intended for the UE may specifically include:

if the SRS control information intended for the UE is used to indicate a set of SRS parameters required when the UE aperiodically sends an SRS, sending, by the UE, an SRS to the base station according to the set of SRS parameters required when the UE aperiodically sends an SRS; or if the SRS control information intended for the UE is used to instruct to not send an SRS, not sending, by the UE, an SRS to the base station.

Optionally, with reference to the second possible implementation, in the second aspect, the triggering, by the UE, an SRS according to the SRS control information intended for the UE may specifically include:

if one bit in the SRS control information intended for the UE is used to instruct the UE to periodically send an SRS, and bits other than the one bit in the SRS control information intended for the UE are used to indicate a set of SRS parameters required when the UE periodically sends an SRS, sending, by the UE, an SRS to the base station according to the set of SRS parameters required when the UE periodically sends an SRS;

if one bit in the SRS control information intended for the UE is used to instruct the UE to periodically send an SRS, and bits other than the one bit in the SRS control information intended for the UE are used to instruct the UE to not send an SRS, not sending, by the UE, an SRS to the base station;

if one bit in the SRS control information intended for the UE is used to instruct the UE to aperiodically send an SRS, and bits other than the one bit in the SRS control information intended for the UE are used to indicate a set of SRS parameters required when the UE aperiodically sends an SRS, sending, by the UE, an SRS to the base station according to the set of SRS parameters required when the UE aperiodically sends an SRS; or if one bit in the SRS control information intended for the UE is used to instruct the UE to aperiodically send an SRS, and bits other than the one bit in the SRS control information intended for the UE are used to instruct the UE to not send an SRS, not sending, by the UE, an SRS to the base station.

Optionally, in the first aspect, the method may further include:

sending, by the base station, first radio resource control RRC (RRC 2) signaling to the UE, where the first RRC signaling includes a first indicator, and the first indicator is used to indicate that a periodic SRS is triggered by using the DCI.

Correspondingly, in a possible implementation of the second aspect, if the one bit in the SRS control information intended for the UE is used to instruct the UE to periodically send an SRS, before the sending, by the UE, an SRS to the base station according to the set of SRS parameters required when the UE periodically sends an SRS, or before the not sending, by the UE, an SRS to the base station, the method may further include:

receiving, by the UE, second RRC (RRC 2) signaling sent by the base station, where the second RRC signaling includes a first indicator, and the first indicator is used to indicate that a periodic SRS is triggered by using the DCI.

Optionally, if the one bit in the SRS control information intended for the UE is used to instruct the UE to periodically send an SRS, the sending, by the UE, an SRS to the base station according to the set of SRS parameters required when the UE periodically sends an SRS includes:

if the one bit in the SRS control information intended for the UE is used to instruct the UE to periodically send an SRS, sending, by the UE, an SRS to the base station according to the first indicator and the set of SRS parameters required when the UE periodically sends an SRS; or if the one bit in the SRS control information intended for the UE is used to instruct the UE to periodically send an SRS, the not sending, by the UE, an SRS to the base station includes:

if the one bit in the SRS control information intended for the UE is used to instruct the UE to periodically send an SRS, not sending, by the UE, an SRS to the base station according to the first indicator.

Optionally, with reference to the third possible implementation, in the second aspect, the triggering, by the UE, an SRS according to the SRS control information intended for the UE may specifically include:

if the SRS control information intended for the UE is used to indicate a set of SRS parameters required when the UE periodically sends an SRS, sending, by the UE, an SRS to the base station according to the set of SRS parameters required when the UE periodically sends an SRS; or if the SRS control information intended for the UE is used to instruct to not send an SRS, not sending, by the UE, an SRS to the base station.

Optionally, with reference to the first possible implementation, in the fourth aspect, the UE further includes a sending unit.

The processing unit is specifically configured to:

if the SRS control information intended for the UE is used to indicate a set of SRS parameters required when the UE aperiodically sends an SRS, send an SRS to the base station by using the sending unit and according to the set of SRS parameters required when the UE aperiodically sends an SRS; or if the SRS control information intended for the UE is used to instruct to not send an SRS, not sending an SRS to the base station.

Optionally, with reference to the second possible implementation, in the fourth aspect, the UE further includes a sending unit.

The processing unit is specifically configured to:

if one bit in the SRS control information intended for the UE is used to instruct the UE to periodically send an SRS, and bits other than the one bit in the SRS control information intended for the UE are used to indicate a set of SRS parameters required when the UE periodically sends an SRS, send an SRS to the base station by using the sending unit and according to the set of SRS parameters required when the UE periodically sends an SRS; or if one bit in the SRS control information intended for the UE is used to instruct the UE to periodically send an SRS, and bits other than the one bit in the SRS control information intended for the UE are used to instruct the UE to not send an SRS, not sending an SRS to the base station; or if one bit in the SRS control information intended for the UE is used to instruct the UE to aperiodically send an SRS, and bits other than the one bit in the SRS control information intended for the UE are used to indicate a set of SRS parameters required when the UE aperiodically sends an SRS, send an SRS to the base station by using the sending unit and according to the set of SRS parameters required when the UE aperiodically sends an SRS; or if one bit in the SRS control information intended for the UE is used to instruct the UE to aperiodically send an SRS, and bits other than the one bit in the SRS control information intended for the UE are used to instruct the UE to not send an SRS, not sending an SRS to the base station.

Optionally, in the third aspect, the sending unit is further configured to send first radio resource control RRC (RRC 2) signaling to the UE, where the first RRC signaling includes a first indicator, and the first indicator is used to indicate that a periodic SRS is triggered by using the DCI.

Correspondingly, in a possible implementation of the fourth aspect, the receiving unit is further configured to: if the one bit in the SRS control information intended for the UE is used to instruct the UE to periodically send an SRS, before the processing unit sends an SRS to the base station by using the sending unit and according to the set of SRS parameters required when the UE periodically sends an SRS, or before the processing unit determines to not send an SRS to the base station, receive second RRC (RRC 2) signaling sent by the base station, where the second RRC signaling includes a first indicator, and the first indicator is used to indicate that a periodic SRS is triggered by using the DCI.

Optionally, the processing unit is specifically configured to:

if the one bit in the SRS control information intended for the UE is used to instruct the UE to periodically send an SRS, send an SRS to the base station by using the sending unit and according to the first indicator and the set of SRS parameters required when the UE periodically sends an SRS, or not sending an SRS to the base station according to the first indicator.

Optionally, with reference to the third possible implementation, in the fourth aspect, the UE further includes a sending unit.

The processing unit is specifically configured to:

if the SRS control information intended for the UE is used to indicate a set of SRS parameters required when the UE periodically sends an SRS, send an SRS to the base station by using the sending unit and according to the set of SRS parameters required when the UE periodically sends an SRS; or if the SRS control information intended for the UE is used to instruct to not send an SRS, not sending an SRS to the base station.

It can be learned from the second possible implementation or the third possible implementation that when the uplink sounding signal triggering method provided in this embodiment of the present invention is used to trigger a periodic SRS, a mechanism for stopping sending the periodic SRS is provided, that is, one combination state is used to instruct the UE to not send an SRS, so that the periodic SRS can be flexibly configured, and resource utilization is improved.

Optionally, in the first aspect, the method may further include:

sending, by the base station, second RRC (RRC 1) signaling to the UE, where the second RRC signaling carries a correspondence between a bit location in the DCI and each of the Y number of UEs.

Correspondingly, in the second aspect, the method may further include:

receiving, by the UE, first radio resource control RRC (RRC 1) signaling sent by the base station, where the first RRC signaling carries a correspondence between a bit location in the DCI and each of the Y number of UEs; and determining, by the UE according to the correspondence, the SRS control information intended for the UE.

Optionally, in the third aspect, the sending unit is further configured to send second RRC (RRC 1) signaling to the UE, where the second RRC signaling carries a correspondence between a bit location in the DCI and each of the Y number of UEs.

Correspondingly, in the fourth aspect, the receiving unit is further configured to receive first radio resource control RRC (RRC 1) signaling sent by the base station, where the first RRC signaling carries a correspondence between a bit location in the DCI and each of the Y number of UEs; and the processing unit determines, according to the correspondence, the SRS control information intended for the UE.

Optionally, in the first aspect, the method may further include:

sending, by the base station, third RRC (RRC 3) signaling to the UE, where the third RRC signaling carries indication information, the indication information is used to instruct the UE to transmit an SRS transmission for M number of times while an aperiodic SRS is triggered once, where M is a positive integer not less than 1.

Correspondingly, in the second aspect, the method may further include:

receiving, by the UE, third RRC (RRC 3) signaling sent by the base station, where the third RRC signaling carries indication information, the indication information is used to instruct the UE to transmit an SRS transmission for M number of times while an aperiodic SRS is triggered once, where M is a positive integer not less than 1.

Optionally, the sending, by the UE, an SRS to the base station according to the set of SRS parameters required when the UE aperiodically sends an SRS may specifically include:

sending, by the UE, an SRS to the base station for M number of times with reference to the indication information and according to the set of SRS parameters required when the UE aperiodically sends an SRS.

Optionally, in the third aspect, the sending unit is further configured to send third RRC (RRC 3) signaling to the UE, where the third RRC signaling carries indication information, the indication information is used to instruct the UE to transmit an SRS transmission for M number of times while an aperiodic SRS is triggered once, where M is a positive integer not less than 1.

Correspondingly, in the fourth aspect, the receiving unit is further configured to receive third RRC (RRC 3) signaling sent by the base station, where the third RRC signaling carries indication information, the indication information is used to instruct the UE to transmit an SRS transmission for M number of times while an aperiodic SRS is triggered once, where M is a positive integer not less than 1.

Optionally, the processing unit is specifically configured to:

send, by using the sending unit, an SRS to the base station for M number of times with reference to the indication information and according to the set of SRS parameters required when the UE aperiodically sends an SRS.

When the uplink sounding signal triggering method or the base station provided in the embodiments of the present invention is used to trigger the aperiodic SRS, the SRS may be triggered for M number of times by using the DCI. This can reduce DCI signaling and reduce signaling overheads compared with a prior-art manner in which a DCI can be used to trigger only one UE to send an SRS once when an aperiodic SRS is triggered.

In addition, for existing periodic SRS transmission, an SRS is triggered by using RRC-based configuration. The RRC-based configuration is semi-static configuration, and the SRS cannot be reconfigured or the configuration cannot be stopped in a timely manner. Therefore, a flexible configuration requirement is far from being met. To resolve this problem, the embodiments of the present invention provide an uplink channel sounding method and system, and an apparatus, to resolve at least a problem of inflexible configuration in the existing periodic SRS transmission.

To achieve the foregoing objective, the following technical solutions are provided in the embodiments of the present invention:

According to a fifth aspect, an uplink sounding signal triggering method is provided, where the method includes:

receiving, by user equipment UE, radio resource control RRC (RRC 4) signaling sent by a base station, where the RRC signaling includes a first indicator, and the first indicator is used to indicate that a periodic SRS is triggered by using downlink control information DCI;

receiving, by the UE, a DCI sent by the base station, where the DCI includes sounding reference signal SRS control information intended for $i^{th}$ UE in a cell managed by the base station, $1 \leq i \leq N$, N is a total quantity of UEs in the cell managed by the base station, and both i and N are positive integers; and triggering, by the UE after detecting that the DCI includes SRS control information intended for the UE, an SRS according to the first indicator and the SRS control information intended for the UE.

A difference from a periodic SRS trigger mechanism in the prior art lies in that, in this embodiment of the present invention, the base station sends the RRC signaling, the RRC signaling includes the first indicator, and the first indicator is used to indicate that an SRS is triggered by using the DCI. In this way, after the UE receives the DCI that is sent by the base station and that includes the SRS control information intended for the $i^{th}$ UE in the cell managed by the base station, and detects that the DCI includes the SRS control information intended for the UE, the UE can trigger an SRS according to the first indicator and the SRS control information intended for the UE. DCI-based configuration is dynamic configuration, and the SRS can be reconfigured or the configuration can be stopped in a timely manner. Therefore, a flexible configuration requirement can be met.

According to a sixth aspect, an uplink sounding signal triggering method is provided, where the method includes:

sending, by a base station, radio resource control RRC (RRC 4) signaling, where the RRC signaling includes a first indicator, and the first indicator is used to indicate that a periodic sounding reference signal SRS is triggered by using downlink control information DCI; and sending, by the base station, a DCI by using a physical downlink control channel, where the DCI includes SRS control information intended for $i^{th}$ UE in a cell managed by the base station, 1≤i≤N, N is a total quantity of UEs in the cell managed by the base station, and both i and N are positive integers.

A difference from a periodic SRS trigger mechanism in the prior art lies in that, in this embodiment of the present invention, the base station sends the RRC signaling, the RRC signaling includes the first indicator, and the first indicator is used to indicate that an SRS is triggered by using the DCI. In this way, after the UE receives the DCI that is sent by the base station and that includes the SRS control information intended for the $i^{th}$ UE in the cell managed by the base station, and detects that the DCI includes the SRS control information intended for the UE, the UE can trigger an SRS according to the first indicator and the SRS control information intended for the UE. DCI-based configuration is dynamic configuration, and the SRS can be reconfigured or the configuration can be stopped in a timely manner. Therefore, a flexible configuration requirement can be met.

According to a seventh aspect, user equipment UE is provided, where the UE includes a receiving unit and a processing unit;

the receiving unit is configured to receive radio resource control RRC (RRC 4) signaling sent by a base station, where the RRC signaling includes a first indicator, and the first indicator is used to indicate that a periodic SRS is triggered by using downlink control information DCI;

the receiving unit is further configured to receive a DCI sent by the base station, where the DCI includes sounding reference signal SRS control information intended for $i^{th}$ UE in a cell managed by the base station, 1≤i≤N, N is a total quantity of UEs in the cell managed by the base station, and both i and N are positive integers; and the processing unit is configured to trigger, after it is detected that the DCI includes SRS control information intended for the UE, an SRS according to the first indicator and the SRS control information intended for the UE.

The UE in this embodiment of the present invention may be configured to perform the uplink sounding signal triggering method in the fifth aspect. Therefore, for technical effects that can be achieved by the UE, refer to the technical effects of performing the uplink sounding signal triggering method by the UE in the fifth aspect. Details are not described herein again.

According to an eighth aspect, a base station is provided, where the base station includes a sending unit;

the sending unit is configured to send radio resource control RRC (RRC 4) signaling, where the RRC signaling includes a first indicator, and the first indicator is used to indicate that a periodic sounding reference signal SRS is triggered by using downlink control information DCI; and the sending unit is further configured to send a DCI by using a physical downlink control channel, where the DCI includes SRS control information intended for $i^{th}$ UE in a cell managed by the base station, 1≤i≤N, N is a total quantity of UEs in the cell managed by the base station, and both i and N are positive integers.

The base station in this embodiment of the present invention may be configured to perform the uplink sounding signal triggering method in the sixth aspect. Therefore, for technical effects that can be achieved by the base station, refer to the technical effects of performing the uplink sounding signal triggering method by the base station in the sixth aspect. Details are not described herein again.

Optionally, in any one of the fifth aspect to the eighth aspect, a bit quantity of the SRS control information intended for the $i^{th}$ UE is $k_i$, one of $k_i$ bits is used to instruct the UE to periodically or aperiodically send an SRS, s combination states in $2^{k_i-1}$ combination states represented by other ($k_i$–1) bits in the $k_i$ bits are separately used to indicate a set of SRS parameters required when the UE periodically or aperiodically sends an SRS, and one of combination states other than the s combination states in the $2^{k_i-1}$ combination states is used to instruct the UE to not send an SRS, where $1 \leq s \leq 2^{k_i-1}-1$, s is an integer, and $k_i$ is a positive integer greater than 1.

Optionally, in the fifth aspect, the triggering, by the UE, an SRS according to the first indicator and the SRS control information intended for the UE may specifically include:

if one bit in the SRS control information intended for the UE is used to instruct the UE to periodically send an SRS, and bits other than the one bit in the SRS control information intended for the UE are used to indicate a set of SRS parameters required when the UE periodically sends an SRS, sending, by the UE, an SRS to the base station according to the first indicator and the set of SRS parameters required when the UE periodically sends an SRS; or if one bit in the SRS control information intended for the UE is used to instruct the UE to periodically send an SRS, and bits other than the one bit in the SRS control information intended for the UE are used to instruct the UE to not send an SRS, not sending, by the UE, an SRS to the base station according to the first indicator; or if one bit in the SRS control information intended for the UE is used to instruct the UE to aperiodically send an SRS, and bits other than the one bit in the SRS control information intended for the UE are used to indicate a set of SRS parameters required when the UE aperiodically sends an SRS, sending, by the UE, an SRS to the base station according to the set of SRS parameters required when the UE aperiodically sends an SRS; or if one bit in the SRS control information intended for the UE is used to instruct the UE to aperiodically send an SRS, and bits other than the one bit in the SRS control information intended for the UE are used to instruct the UE to not send an SRS, not sending, by the UE, an SRS to the base station.

Optionally, in the seventh aspect, the UE further includes a sending unit.

The processing unit is specifically configured to:

if one bit in the SRS control information intended for the UE is used to instruct the UE to periodically send an SRS, and bits other than the one bit in the SRS control information intended for the UE are used to indicate a set of SRS parameters required when the UE periodically sends an SRS, send an SRS to the base station by using the sending unit and according to the first indicator and the set of SRS parameters required when the UE periodically sends an SRS; or if one bit in the SRS control information intended for the UE is used to instruct the UE to periodically send an SRS, and bits other than the one bit in the SRS control information intended for the UE are used to instruct the UE to not send an SRS, not sending an SRS to the base station according to the first indicator; or if one bit in the SRS control information intended for the UE is used to instruct the UE to aperiodically send an SRS, and bits other than the one bit in the SRS control information intended for the UE are used to indicate a set of SRS parameters required when the UE aperiodically sends an SRS, send an SRS to the base station by using the sending unit and according to the set of SRS parameters required when the UE aperiodically sends an SRS; or if one bit in the SRS control information intended for the UE is used to instruct the UE to aperiodically send an SRS, and bits other than the one bit in the SRS control information intended for the UE are used to instruct the UE to not send an SRS, not sending an SRS to the base station.

Optionally, in any one of the fifth aspect to the eighth aspect, a cyclic redundancy check CRC of the DCI is scrambled by using a first radio network temporary identifier RNTI or a second RNTI, the first RNTI is an RNTI corresponding to periodically sending an SRS by the $i^{th}$ UE in the cell managed by the base station, and the second RNTI is an RNTI corresponding to aperiodically sending an SRS by the $i^{th}$ UE in the cell managed by the base station.

Optionally, in the fifth aspect, the triggering, by the UE after detecting that the DCI includes SRS control information intended for the UE, an SRS according to the first indicator and the SRS control information intended for the UE includes:

if the UE detects, by using the first RNTI, that the DCI includes the SRS control information intended for the UE, and the SRS control information intended for the UE is used to indicate a set of SRS parameters required when the UE periodically sends an SRS, sending, by the UE, an SRS to the base station according to the first indicator and the set of SRS parameters required when the UE periodically sends an SRS; or if the UE detects, by using the first RNTI, that the DCI includes the SRS control information intended for the UE, and the SRS control information intended for the UE is used to instruct the UE to not send an SRS, not sending, by the UE, an SRS to the base station according to the first indicator; or if the UE detects, by using the second RNTI, that the DCI includes the SRS control information intended for the UE, and the SRS control information intended for the UE is used to indicate a set of SRS parameters required when the UE aperiodically sends an SRS, sending, by the UE, an SRS to the base station according to the first indicator and the set of SRS parameters required when the UE aperiodically sends an SRS; or if the UE detects, by using the second RNTI, that the DCI includes the SRS control information intended for the UE, and the SRS control information intended for the UE is used to instruct the UE to not send an SRS, not sending, by the UE, an SRS to the base station according to the first indicator.

Optionally, in the seventh aspect, the UE further includes a sending unit.

The processing unit is specifically configured to:

if the UE detects, by using the first RNTI, that the DCI includes the SRS control information intended for the UE, and the SRS control information intended for the UE is used to indicate a set of SRS parameters required when the UE periodically sends an SRS, send an SRS to the base station by using the sending unit and according to the first indicator and the set of SRS parameters required when the UE periodically sends an SRS; or if the UE detects, by using the first RNTI, that the DCI includes the SRS control information intended for the UE, and the SRS control information intended for the UE is used to instruct the UE to not send an SRS, not sending an SRS to the base station according to the first indicator; or if the UE detects, by using the second RNTI, that the DCI includes the SRS control information intended for the UE, and the SRS control information intended for the UE is used to indicate a set of SRS parameters required when the UE aperiodically sends an SRS, send an SRS to the base station by using the sending unit and according to the first indicator and the set of SRS parameters required when the UE aperiodically sends an SRS; or if the UE detects, by using the second RNTI, that the DCI includes the SRS control information intended for the UE, and the SRS control information intended for the UE is used to instruct the UE to not send an SRS, not sending an SRS to the base station according to the first indicator.

It should be noted that two implementations are provided merely as examples in which when the UE receives the DCI in a scenario in which the DCI may be used to trigger an aperiodic SRS or a periodic SRS, the UE can determine whether to trigger the aperiodic SRS or the periodic SRS. Certainly, there may be another possible implementation. This is not specifically limited in this embodiment of the present invention.

According to a ninth aspect, a base station is provided, including a processor, a memory, a system bus, and a communications interface, where the memory is configured to store a computer executable instruction, the processor and the memory are connected by using the system bus, and when the base station runs, the processor executes the computer executable instruction stored in the memory, so that the base station performs the uplink sounding signal triggering method in any one of the first aspect or the optional manners of the first aspect, or so that the base station performs the uplink sounding signal triggering method in any one of the sixth aspect or the optional manners of the sixth aspect.

The base station provided in this embodiment of the present invention may perform the uplink sounding signal triggering method. Therefore, for technical effects that can be achieved by the base station, refer to the method embodiments. Details are not described herein again in this embodiment of the present invention.

According to a tenth aspect, a readable medium is provided, including a computer executable instruction, and when a processor of a base station executes the computer executable instruction, the base station performs the uplink sounding signal triggering method in any one of the first aspect or the optional manners of the first aspect, or the base station performs the uplink sounding signal triggering method in any one of the sixth aspect or the optional manners of the sixth aspect.

The readable medium provided in this embodiment of the present invention may be used to perform the uplink sounding signal triggering method. Therefore, for technical effects that can be achieved by the readable medium, refer to the method embodiments. Details are not described herein again in this embodiment of the present invention.

According to an eleventh aspect, user equipment UE is provided, including a processor, a memory, a system bus, and a communications interface, where the memory is configured to store a computer executable instruction, the processor and the memory are connected by using the system bus, and when the UE runs, the processor executes the computer executable instruction stored in the memory, so that the UE performs the uplink sounding signal triggering method in any one of the second aspect or the optional manners of the second aspect, or so that the UE performs the uplink sounding signal triggering method in any one of the fifth aspect or the optional manners of the fifth aspect.

The UE provided in this embodiment of the present invention may perform the uplink sounding signal triggering method. Therefore, for technical effects that can be achieved by the UE, refer to the method embodiments. Details are not described herein again in this embodiment of the present invention.

According to a twelfth aspect, an embodiment of the present invention provides a readable medium, including a computer executable instruction, and when a processor of a UE executes the computer executable instruction, the UE performs the uplink sounding signal triggering method in any one of the second aspect or the optional manners of the second aspect, or the UE performs the uplink sounding signal triggering method in any one of the fifth aspect or the optional manners of the fifth aspect.

The readable medium provided in this embodiment of the present invention may be used to perform the uplink sounding signal triggering method. Therefore, for technical effects that can be achieved by the readable medium, refer to the method embodiments. Details are not described herein again in this embodiment of the present invention.

According to a thirteenth aspect, an uplink sounding signal triggering system is provided, the uplink sounding signal triggering system includes a base station and a plurality of user equipments UEs, the base station may be the base station in any one of the third aspect or the optional manners of the third aspect, and the plurality of UEs may be the UE in any one of the fourth aspect or the optional manners of the fourth aspect; or the base station may be the base station in any one of the eighth aspect or the optional manners of the eighth aspect, and the plurality of UEs may be the UE in any one of the seventh aspect or the optional manners of the seventh aspect.

Optionally, the base station may be the base station in the ninth aspect, and the plurality of UEs may be the UE in the tenth aspect; or the base station may be the base station in the eleventh aspect, and the plurality of UEs may be the UE in the twelfth aspect.

The uplink sounding signal triggering system provided in this embodiment of the present invention includes the base station in any one of the third aspect or the optional manners of the third aspect, and the UE in any one of the fourth aspect or the optional manners of the fourth aspect; or includes the base station in any one of the eighth aspect or the optional manners of the eighth aspect, and the UE in any one of the seventh aspect or the optional manners of the seventh aspect. Therefore, for technical effects that can be achieved by the system, refer to the embodiments of the base station or the UE. Details are not described herein again in this embodiment of the present invention.

DESCRIPTION OF EMBODIMENTS

Figure 1:
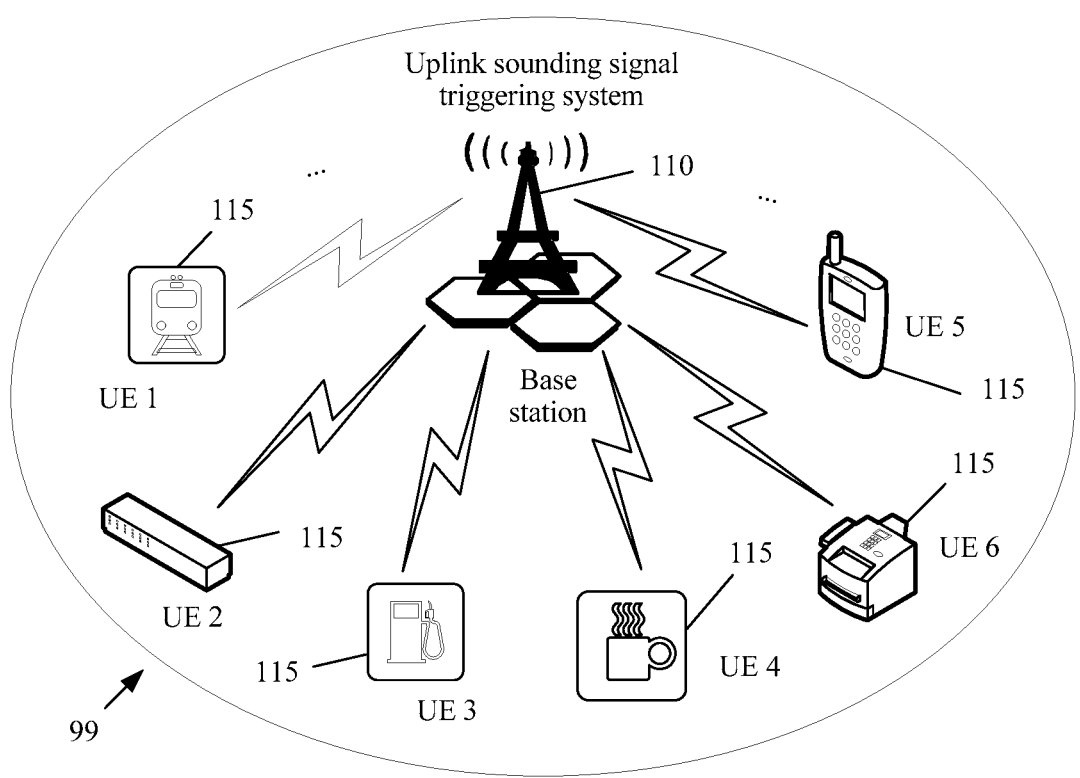
FIG. 1 is a diagram of an uplink sounding signal triggering system according to an embodiment.

To make descriptions of each embodiment clear and concise, related technologies are first briefly described:

As described in the background, in an existing LTE protocol, UE sends a sounding reference signal (SRS) based on two trigger mechanisms: a trigger type 0 or a trigger type 1. The trigger type 0 corresponds to a periodic SRS transmission, and results in a triggering performed using RRC signaling. The trigger type 1 corresponding to an aperiodic SRS transmission, and results in a triggering performed using a DCI of a PDCCH or ePDCCH. A DCI format 0/4/1A is used for frequency division duplexing (FDD) and time division duplexing (TDD), while a DCI format 2B/2C/2D is used only for TDD.

In the prior art, for the aperiodic SRS transmission, a DCI is used to trigger one UE to send an SRS once. Table 1 is an SRS request type table for the DCI format 4 of the trigger type 1.

TABLE 1

| SRS request field value | Description |
| --- | --- |
| "00" | Non-trigger state |
| "01" | First set of SRS parameters configured using RRC signaling |
| "10" | Second set of SRS parameters configured using RRC signaling |
| "11" | Third set of SRS parameters configured using RRC signaling |

It can be seen from Table 1 that higher layer RRC signaling can be used to configure three sets of RRC parameters and a non-trigger state for one UE, and each time, 2 bits in the DCI format 4 are used to trigger one of the three sets of RRC parameters or instruct not to trigger an SRS (that is, the non-trigger state).

For the DCI format 0/1A/2B/2C/2D, the higher layer RRC signaling is used to configure one set of SRS parameters for each UE, and 1 bit in the DCI format 0/1A/2B/2C/2D is used to trigger the set of SRS parameters.

However, for the existing aperiodic SRS transmission, the DCI of a PDCCH or an ePDCCH can be used to configure only one UE, to send an SRS once. When an SRS needs to be rapidly configured for a plurality of UEs in a short time in a wireless communications system, the system has relatively large signaling overhead. For the existing periodic SRS transmission, an SRS is triggered using RRC-based configuration. The RRC-based configuration is a semi-static configuration (it takes a long time period for the configuration to take effect, and 20-30 milliseconds (ms) are usually required). The SRS cannot be reconfigured, or the configuration cannot be stopped in a timely manner. Therefore, a flexible configuration requirement is far from being met.

To resolve this problem, embodiments provide an uplink sounding signal triggering method, system, and apparatus. Technical solutions in the embodiments are described below with reference to the accompanying drawings in the embodiments.

It should be noted that, to facilitate clear descriptions of the technical solutions in the embodiments, words such as "first" and "second" are used in the embodiments to distinguish between same items or similar items that provide basically the same functions or purposes. A person skilled in the art may understand that the words such as "first" and "second" do not limit a quantity or do not limit an execution order.

It should be noted that, "/" in the specification indicates a meaning of or, for example, A/B may indicate A or B. The term "and/or" in the specification describes only an association relationship for describing associated objects and represents that three relationships may exist. For example, A and/or B may represent the following three cases: Only A exists, both A and B exist, or only B exists. "A plurality of" refers to two or more.

Terms such as "component", "module", and "system" are used to indicate computer-related entities. The computer-related entities may be hardware, firmware, a combination of hardware and software, software, or software being executed. For example, the component may be (but not limited to) a process that runs on a processor, a processor, an object, an executable file, a thread of execution, a program, and/or a computer. For example, both a computing device and an application that runs on the computing device may be components. One or more components may reside within a process and/or a thread of execution, and the component may be located on one computer and/or distributed between two or more computers. In addition, these components may be executed from various computer-readable media that have various data structures. These components may communicate using a local process and/or a remote process and according to, for example, a signal having one or more data packets (for example, data from one component, where the component interacts with another component in a local system or a distributed system, and/or interacts with another system via a network such as the Internet using a signal).

A wireless communications network is a network that provides a wireless communication function. The wireless communications network may use different communications technologies, for example, Code Division Multiple Access (CDMA), Wideband Code Division Multiple Access (WCDMA), Time Division Multiple Access (TDMA), Frequency Division Multiple Access (FDMA), orthogonal frequency division multiple access (OFDMA), single carrier frequency division multiple access (SC-FDMA), and carrier sense multiple access with collision avoidance (CSMA/CA). Networks may be classified into a second generation (2G) network, a third generation (3G) network, or a fourth generation (4G) network according to factors such as capacities, rates, and delays of different networks. A typical 2G network includes a Global System for Mobile Communications (GSM) network or a general packet radio service (GPRS) network. A typical 3G network includes a Universal Mobile Telecommunications System (UMTS) network. A typical 4G network includes an LTE network. The UMTS network may be referred to as a universal terrestrial radio access network (UTRAN). The LTE network may be referred to as an evolved universal terrestrial radio access network (E-UTRAN). According to different resource allocation manners, networks may be classified into a cellular communications network and a wireless local area network (WLAN). In the cellular communications network, resources are allocated mainly by means of scheduling, and in the WLAN, resources are allocated mainly in a contention-based manner. The 2G, 3G, and 4G networks are cellular communications networks. A person skilled in the art should know that, with development of technologies, the technical solutions provided in the embodiments may also be applied to another wireless communications network such as a 4.5G or 5G network, or another non-cellular communications network. For brevity, the wireless communications network may be referred to as a network.

A UE is a terminal device, and may be a mobile terminal device or fixed/stationary terminal device. The UE is mainly configured to receive or send service data. The user equipment may be distributed in a network. The user equipment has different names in different networks, for example, a terminal, a mobile station, a subscriber unit, a station, a cellular phone, a personal digital assistant, a wireless modem, a wireless communications device, a handheld device, a laptop computer, a cordless telephone, and a wireless local loop station. The user equipment may communicate with one or more core networks using a radio access network (RAN) (an access part of a wireless communications network), for example, exchange voice and/or data with the radio access network.

A base station device, which may also be referred to as a base station, is an apparatus that is deployed in the radio access network to provide a wireless communication function. For example, a device that provides a base station function in a 2G network includes a wireless base transceiver station (BTS) and a base station controller (BSC); a device that provides a base station function in a 3G network includes a NodeB (NB) and a radio network controller (RNC); a device that provides a base station function in a 4G network includes an evolved NodeB (eNB); and a device that provides a base station function in a WLAN is an access point (AP).

In addition, this application describes all aspects with reference to a wireless network device. The wireless network device may be a base station, and the base station may be configured to communicate with one or more user equipments, or may be configured to communicate with one or more base stations with some user equipment functions (for example, communication between a macro base station and a micro base station, for example, between access points). Alternatively, the wireless network device may be user equipment, and the user equipment may be configured to communicate with one or more user equipments (for example, device-to-device (D2D) communication), or may be configured to communicate with one or more base stations. The user equipment may also be referred to as a user terminal, and may include some or all functions of a system, a subscriber unit, a subscriber station, a mobile station, a mobile wireless terminal, a mobile device, a node, a device, a remote station, a remote terminal, a terminal, a wireless communications device, a wireless communications apparatus, or a user agent. The user equipment may be a cellular phone, a cordless telephone, a Session Initiation Protocol (SIP) phone, a smartphone, a wireless local loop (WLL) station, a personal digital assistant (PDA), a laptop computer, a handheld communications device, a handheld computing device, a satellite wireless device, a wireless modem card, and/or another processing device configured to communicate in a wireless system. The base station may also be referred to as an access point, a node, a NodeB, an evolved NodeB, or another network entity, and may include some or all functions of the foregoing network entities. The base station may communicate with a wireless terminal using an air interface. The communication may be performed using one or more sectors. The base station may convert a received air interface frame into an IP packet and serve as a router between the wireless terminal and a remaining portion of an access network. The access network includes an Internet Protocol (IP) network. The base station may further coordinate air interface attribute management, and may be a gateway between a wired network and a wireless network.

All aspects, embodiments, or features are presented in this application by describing a system that may include a plurality of devices, components, modules, and the like. It should be appreciated and understood that, each system may include another device, component, module, and the like, and/or may exclude all devices, components, modules, and the like discussed with reference to the accompanying drawings. In addition, a combination of these solutions may be used.

In addition, the word "example" in the embodiments is used to represent giving an example, an illustration, or a description. Any embodiment or design scheme described as an "example" in this application should not be explained as being more preferred or having more advantages than another embodiment or design scheme. Exactly, "example" is used to present a concept in a specific manner.

In the embodiments, information, signal, message, and channel may be used to replace each other sometimes. The terms "of", "relevant", or "corresponding" may be used interchangeably. It should be noted that expressed meanings are consistent when differences are not emphasized.

A described network architecture and service scenario embodiments are intended to describe the technical solutions embodiments more clearly, but are not construed as a limitation on the technical solutions provided in the embodiments. A person of ordinary skill in the art may understand that, with evolution of the network architecture and emergence of a new service scenario, the technical solutions provided in the embodiments are also applicable to a similar technical problem.

The embodiments are illustrated using a 4G network scenario in a wireless communications network. It should be noted that the solutions in the embodiments may be further applied to other wireless communications networks, and a corresponding name may be replaced with a corresponding function name in the other wireless communications networks.

FIG. 1 is a diagram of an uplink sounding signal triggering system 99 comprising a base station (BS) 110 and a number of user equipments (UEs) 115, shown in the figure as the UEs 1-6 115. The uplink sounding signal triggering system 99 includes the number of UEs 115 in a cell managed by the BS 110. The BS 110 may communicate with each of the UEs 115.

Figure 2:
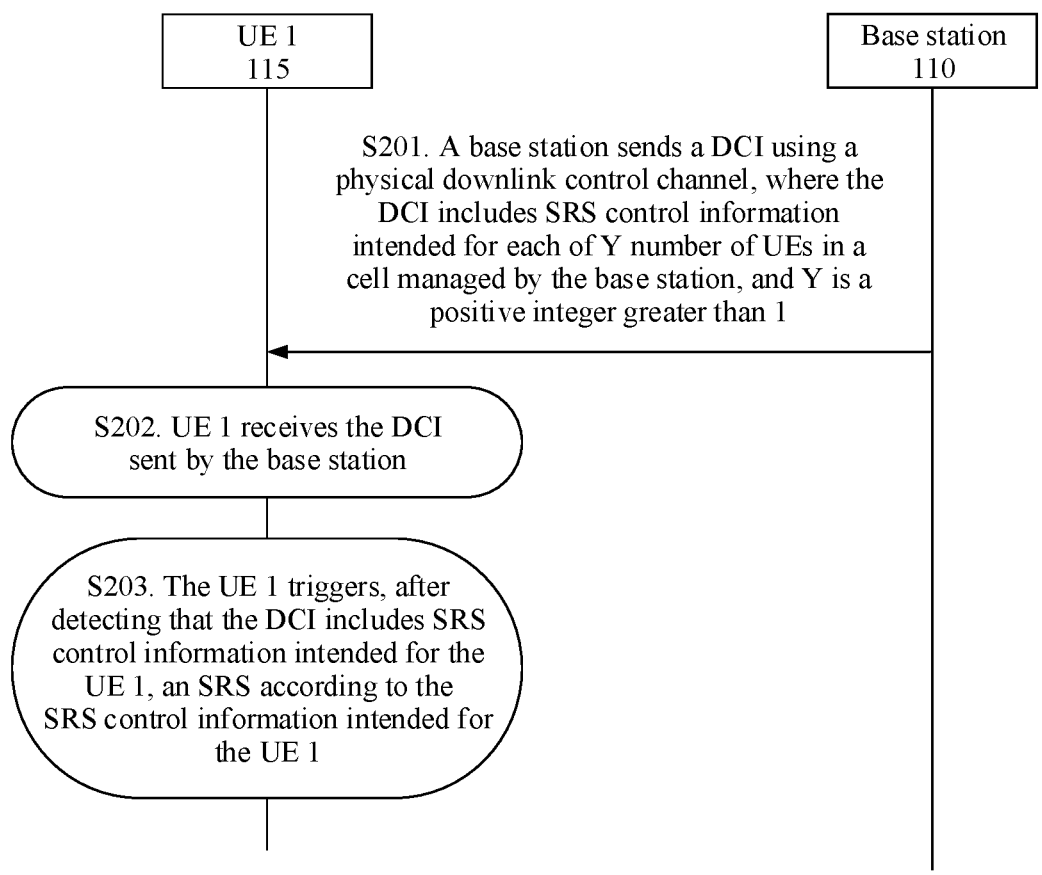
FIG. 2 is an interaction diagram of an uplink sounding signal triggering method according to an embodiment.

FIG. 2 is an interaction diagram of an uplink sounding signal triggering method 200. The method 200 is based on the uplink sounding signal triggering system 99. Interaction between the BS 110 and a UE 115 is used as an example, and the UE 115 is any UE 115 in a cell managed by the BS 110.

In step S201, the BS 110 sends the DCI using a physical downlink control channel. The DCI includes SRS control information intended for each UE 115 of the Y number of UEs in the cell managed by the BS 110. The Y term is a positive integer greater than one (1).

In step S202, a UE 115 (such as UE 1 115) receives the DCI sent by the BS 110.

In step S203, the UE 115 triggers, after detecting that the DCI includes SRS control information intended for the UE 115, a SRS transmission according to the SRS control information corresponding to the UE 115.

In step S201 in this embodiment, details are as follows:

In an LTE system, the physical downlink control channel is used to transmit the DCI to the UE 115, and the DCI may be considered as a message used for carrying control information. For example, the DCI may include one or more of uplink/downlink scheduling information, resource allocation, transport format, an aperiodic channel quality indicator (CQI) request report, or uplink power control. This is not specifically limited in this embodiment.

The Y number of UEs in the cell managed by the BS 110 may be randomly selected by the BS 110, or may be selected by the BS 110 using a preset policy. For example, the BS 110 may classify N UEs in the cell managed by the BS 110 into M groups of UEs, and the Y number of UEs in the cell managed by the BS 110 are UEs in one group of UEs in the M groups of UEs, where both N and M are positive integers. A classification rule includes but is not limited to the following content: different services of the UEs, geographical locations of the UEs, power of the UEs, or different types of the UEs.

A manner of selecting the Y number of UEs in the cell managed by the base station is not specifically limited in this embodiment.

Optionally, a bit quantity of SRS control information intended for $i^{th}$ UE in the Y number of UEs in the cell managed by the base station is $k_i$, with i comprising an integer according to $1 \leq i \leq Y$, and with $k_i$ comprising a positive integer. The index i can therefore comprise an index number in the range of 1, 2, ... Y.

That is, in this embodiment, the bit quantity of the SRS control information intended for the $i^{th}$ UE may be not limited to 1 or 2, and may be set to any positive integer not less than 1, such as 3, 4, or 5 as required. This is not specifically limited in this embodiment.

A person of ordinary skill in the art easily understands that $k_i$ bits may represent $2^{k_i}$ combination states. For example, 2 bits may represent 4 combination states: combination states corresponding to "00", "01", "10", and "11". In this embodiment, for different application scenarios, $2^{k_i}$ combination states represented by $k_i$ bits in the SRS control information intended for the $i^{th}$ UE are corresponding to different indication manners, and some indication manners provided as examples are as follows.

Indication manner 1: The DCI is used for triggering only an aperiodic SRS, combination states in the $2^{k_i}$ combination states represented by the $k_i$ bits in the SRS control information intended for the $i^{th}$ UE in the Y number of UEs are separately used to indicate a set of SRS parameters (there are a maximum of $s_i$ sets of SRS parameters, or there may be less than $s_i$ sets of SRS parameters, for example, a combination state is "reserved" indicating that no allocation is performed temporarily) required when the UE aperiodically sends an SRS, and one of combination states other than the $s_i$ combination states in the $2^{k_i}$ combination states is used to instruct the UE not to send an SRS, where $1 \leq s_i \leq 2^{k_i}-1$, and $s_i$ is an integer. It may be understood that, alternatively, one bit may be independently used to instruct the UE not to send an SRS, and a value of $s_i$ also changes accordingly. Details are not described.

Indication manner 2: The DCI may be used for triggering an aperiodic SRS, or may be used for triggering a periodic SRS, one of the $k_i$ bits in the SRS control information intended for the $i^{th}$ UE in the Y number of UEs is used to instruct the UE to periodically or aperiodically send an SRS, $s_i$ combination states in $2^{k_i-1}$ combination states represented by other $(k_i-1)$ bits in the $k_i$ bits are separately used to indicate a set of SRS parameters (there are a maximum of $s_i$ sets of SRS parameters, or there may be less than $s_i$ sets of SRS parameters, for example, a combination state is "reserved" indicating that no allocation is performed temporarily) required when the UE periodically or aperiodically sends an SRS, and one of combination states other than the $s_i$ combination states in the $2^{k_i-1}$ combination states is used to instruct the UE not to send an SRS, where $1 \leq s_i \leq 2^{k_i-1}-1$, $s_i$ is an integer, and $k_i$ is a positive integer greater than 1. It may be understood that one bit may be independently used to instruct the UE not to send an SRS, and a value of $s_i$ also changes accordingly. Details are not described.

Indication manner 3: The DCI is used for triggering only a periodic SRS, combination states in the $2^{k_i}$ combination states represented by the $k_i$ bits in the SRS control information intended for the $i^{th}$ UE in the Y number of UEs are separately used to indicate a set of SRS parameters required when the UE periodically sends an SRS, and one of combination states other than the $s_i$ combination states in the $2^{k_i}$ combination states is used to instruct the UE not to send an SRS, where $1 \leq s_i \leq 2^{k_i}-1$, and $s_i$ is an integer. It may be understood that one bit may be independently used to instruct the UE not to send an SRS, and a value of $s_i$ also changes accordingly. Details are not described.

Certainly, alternatively, the $2^{k_i}$ combination states represented by the $k_i$ bits may be corresponding to another indication manner, and the foregoing indication manners are merely examples for description. This is not specifically limited in this embodiment. In addition, a same indication manner may have different representation forms. For example, in the indication manner 2, another indication manner may be used for representation, that is, $2^{k_i-1}$ combination states in the $2^{k_i}$ combination states represented by the $k_i$ bits in the SRS control information intended for the $i^{th}$ UE in the Y number of UEs are used to instruct the UE to periodically send an SRS, $s_i$ combination states in the $2^{k_i-1}$ combination states are respectively used to indicate $s_i$ sets of periodic SRS parameters required when the UE periodically sends an SRS, and one of combination states other than the $s_i$ combination states in the $2^{k_i-1}$ combination states is used to instruct the UE not to send an SRS, where $0 \leq s_i \leq 2^{k_i-1}-1$, $s_i$ is an integer, and $k_i$ is a positive integer greater than 1; and $2^{k_i-1}$ combination states other than the $2^{k_i-1}$ combination states in the $2^{k_i}$ combination states are used to instruct the UE to aperiodically send an SRS, $t_i$ combination states in the $2^{k_i-1}$ combination states are respectively used to indicate $t_i$ sets of aperiodic SRS parameters required when the UE aperiodically sends an SRS, and one of combination states other than the $t_i$ combination states in the $2^{k_i-1}$ combination states is used to instruct the UE not to send an SRS, where $0 \leq t_i \leq 2^{k_i-1}-1$, and $t_i$ is an integer.

A representation form of the indication manner 2 is not specifically limited in this embodiment.

It should be noted that, it can be learned from the indication manner 2 and the indication manner 3 that when the uplink sounding signal triggering method provided in this embodiment is used to trigger the periodic SRS, a mechanism for stopping sending the periodic SRS is provided, that is, one combination state is used to instruct the UE not to send an SRS, so that the periodic SRS can be flexibly configured, and resource utilization is improved.

In step S203, details are as follows:

The UE 1 may detect, in the following manners, a location of the SRS control information that is corresponding to the UE 1 and that is included in the DCI:

Manner 1: The UE 1 receives RRC 1 signaling sent by the base station, where the RRC 1 signaling carries a correspondence between a bit location in the DCI and each UE 115 of the Y number of UEs; and the UE 1 determines, according to the correspondence, the SRS control information intended for the UE 1.

For example, the correspondence included in the RRC 1 signaling may be:

(1) a correspondence between a location of an SRS control information bit of the UE 1 in the DCI and a unique identifier of the UE 1, where the location may include a start location and a length of the occupied bit, or may include a start location and an end location, and is not specifically limited; or (2) a list of correspondences between a plurality of UEs and locations of SRS control information bits of the plurality of UEs in the DCI is predefined, where the UE 1 is notified of a number of the UE 1 in the list of correspondences using the RRC 1 signaling, and the UE 1 searches the list to obtain a location of an SRS control information bit of the UE 1 in the DCI.

It should be noted that the RRC 1 signaling in this embodiment may be specifically RRC signaling obtained by adding the correspondence between the bit location in the DCI and each of the Y number of UEs to existing RRC signaling. In this case, the RRC 1 signaling may carry an SRS parameter delivered by the base station to the UE 1. Certainly, alternatively, the RRC 1 signaling may be newly defined signaling that is used to carry the correspondence between the bit location in the DCI and each of the Y number of UEs. In this case, the RRC 1 signaling does not carry an SRS parameter delivered by the base station to the UE 1, and is independently delivered RRC signaling. This is not specifically limited in this embodiment.

In addition, it should be noted that, the RRC 1 signaling is defined to be distinguished from RRC signaling such as RRC 2 signaling, RRC 3 signaling, and RRC 4 signaling in the embodiments. A person skilled in the art may understand that a numeral following RRC constitutes no limitation on a quantity and an execution order, and has no special meaning. Descriptions are provided in a centralized manner herein, and details are not described again below.

Manner 2: The UE 1 obtains a preconfigured binding relationship between a bit location in the DCI and UE, and the UE 1 determines, according to the binding relationship, the SRS control information intended for the UE 1.

For example, a unique identifier (for example, an identity (ID) of the UE and the bit location in the DCI may be bound. For example, it is assumed that the DCI includes SRS control information intended for K number of UEs, and (ID mod K) is a bit location of the UE 1, where mod( ) indicates a modulo operation.

It should be noted that in this embodiment, a cyclic redundancy check (CRC) of the DCI sent by the base station may be scrambled using a radio network temporary identifier (RNTI). Therefore, after the UE 1 receives the DCI, before the UE 1 detects, in the foregoing manners, the location of the SRS control information that is corresponding to the UE 1 and that is included in the DCI, the UE 1 first needs to descramble the DCI, and the UE 1 may know by detecting, only when the descrambling succeeds, whether the DCI includes the SRS control information intended for the UE 1. A specific process of scrambling and descrambling the DCI is not described in detail in this embodiment. For details, refer to an existing implementation solution.

Optionally, a difference from the prior art lies in that, when the Y number of UEs are UEs in one group of UEs after the base station classifies, in the foregoing classification manner, the N UEs in the cell managed by the base station, the base station may configure a same RNTI for the Y number of UEs. The RNTI may be referred to as a group RNTI of a group to which the Y number of UEs belong. In this case, when the UE 1 receives the DCI and descrambles the DCI, the UE 1 detects a group RNTI. The UE 1 can perform descrambling successfully only when the UE 1 is UE in the group to which the Y number of UEs belong. Otherwise, when the UE 1 is not UE in the group to which the Y number of UEs belong, the descrambling fails.

Specifically, when the $2^{k_i}$ combination states represented by the $k_i$ bits in the SRS control information intended for the $i^{th}$ UE are corresponding to different indication manners, specific implementation of triggering, by the UE 1, an SRS according to the SRS control information intended for the UE 1 is also different.

Figure 3:
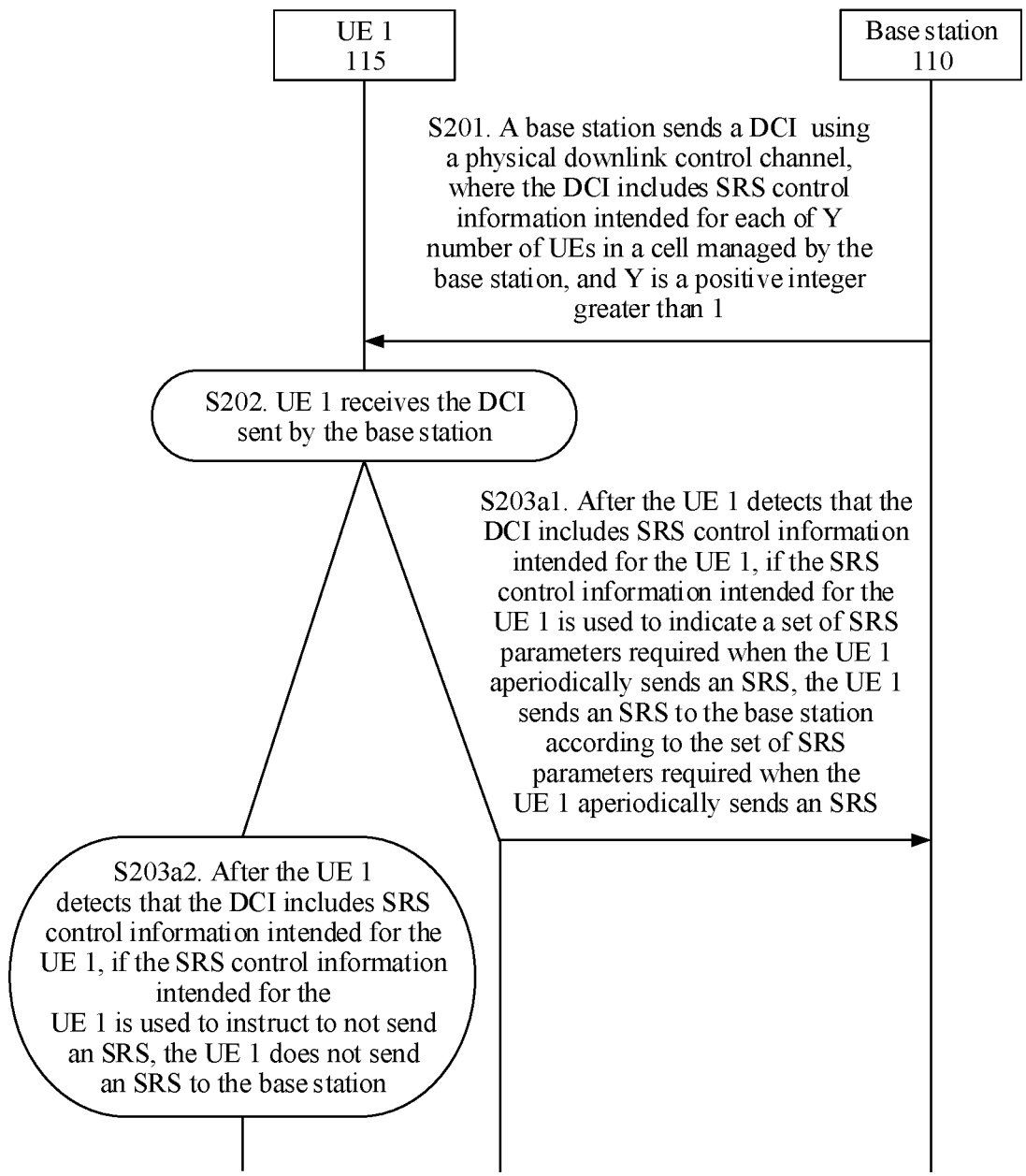
FIG. 3 is an interaction diagram of an uplink sounding signal triggering method according to an embodiment.

When the $2^{k_i}$ combination states represented by the $k_i$ bits in the SRS control information intended for the $i^{th}$ UE are corresponding to the indication manner 1, as shown in FIG. 3, that the UE 1 triggers, after detecting that the DCI includes SRS control information intended for the UE 1, an SRS according to the SRS control information intended for the UE 1 (step S203) may specifically include step S203a1 or S203a2.

S203a1. After the UE 1 detects that the DCI includes the SRS control information intended for the UE 1, if the SRS control information intended for the UE 1 is used to indicate a set of SRS parameters required when the UE 1 aperiodically sends an SRS, the UE 1 sends an SRS to the base station according to the set of SRS parameters required when the UE 1 aperiodically sends an SRS.

S203a2. After the UE 1 detects that the DCI includes the SRS control information intended for the UE 1, if the SRS control information intended for the UE 1 is used to instruct not to send an SRS, the UE 1 determines not to send an SRS to the base station.

Figure 4A:
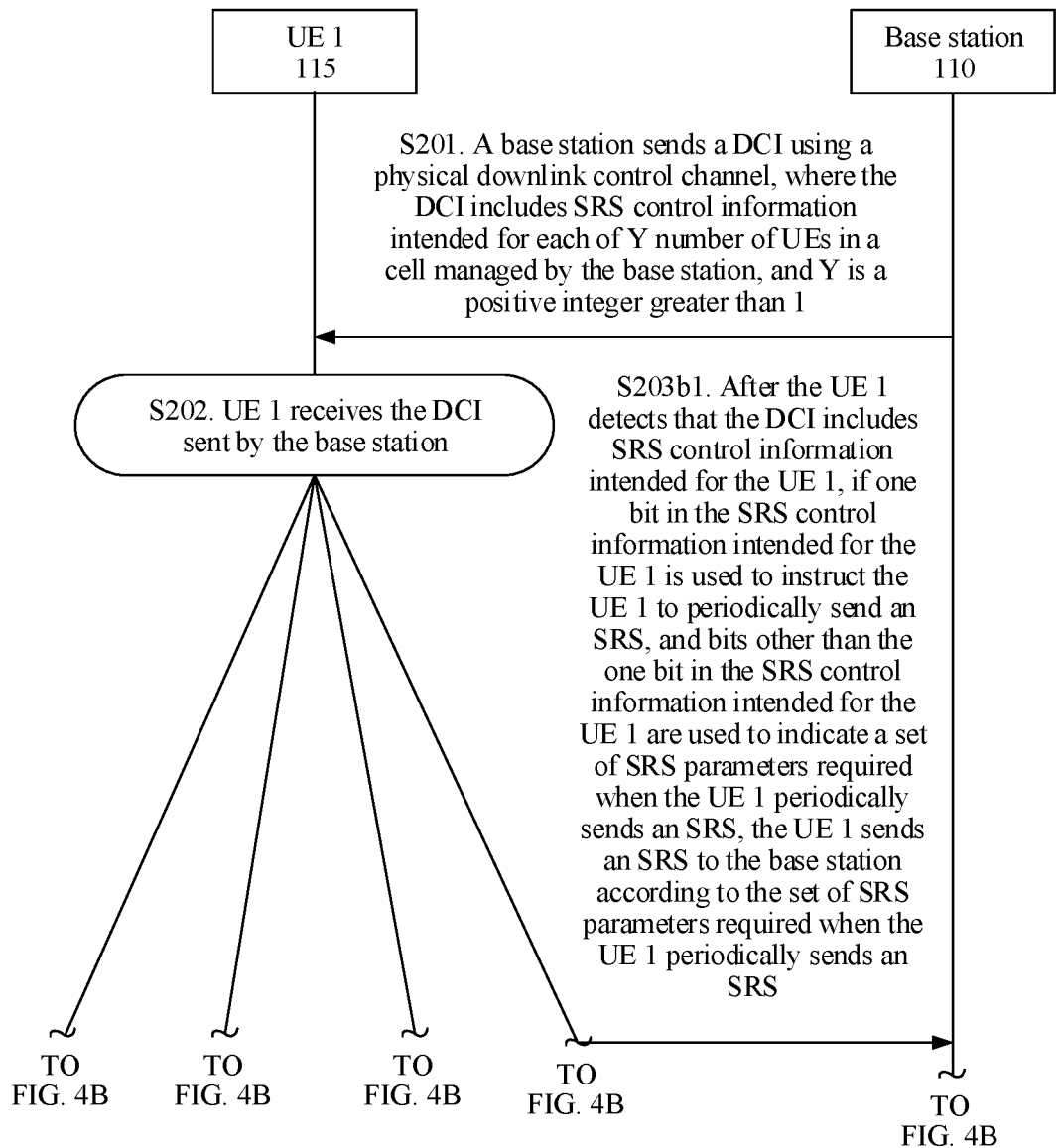
FIG. 4A and FIG. 4B are an interaction diagram of an uplink sounding signal triggering method according to an embodiment.
Figure 4B:
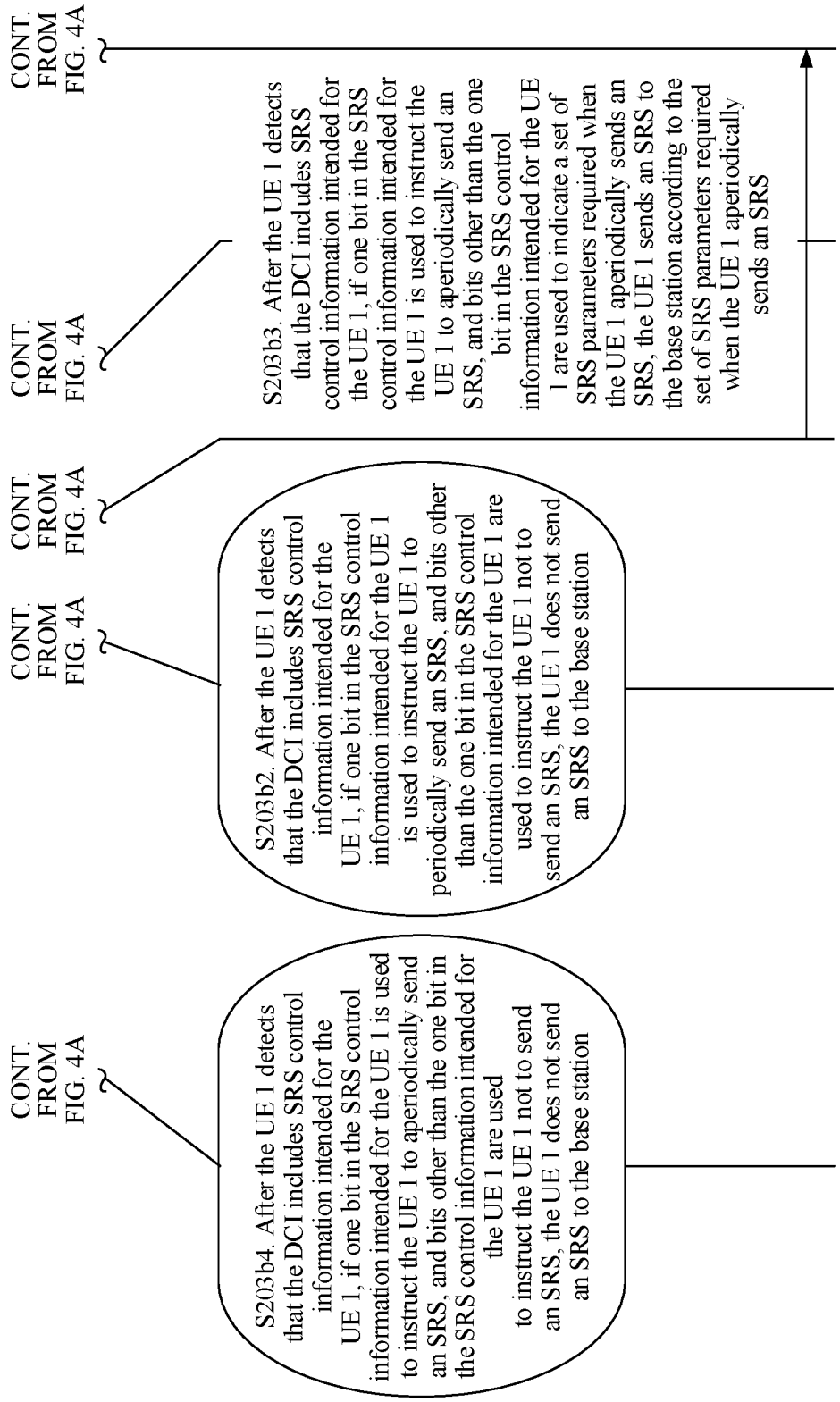

When the $2^{k_i}$ combination states represented by the $k_i$ bits in the SRS control information intended for the $i^{th}$ UE are corresponding to the indication manner 2, as shown in FIG. 4A and FIG. 4B, that the UE 1 triggers, after detecting that the DCI includes SRS control information intended for the UE 1, an SRS according to the SRS control information intended for the UE 1 (step S203) may specifically include any one of steps S203b1 to S203b4.

S203b1. After the UE 1 detects that the DCI includes the SRS control information intended for the UE 1, if one bit in the SRS control information intended for the UE 1 is used to instruct the UE 1 to periodically send an SRS, and bits other than the one bit in the SRS control information intended for the UE 1 are used to indicate a set of SRS parameters required when the UE 1 periodically sends an SRS, the UE 1 sends an SRS to the base station according to the set of SRS parameters required when the UE 1 periodically sends an SRS.

S203b2. After the UE 1 detects that the DCI includes the SRS control information intended for the UE 1, if one bit in the SRS control information intended for the UE 1 is used to instruct the UE 1 to periodically send an SRS, and bits other than the one bit in the SRS control information intended for the UE 1 are used to instruct the UE 1 not to send an SRS, the UE 1 determines not to send an SRS to the base station.

S203b3. After the UE 1 detects that the DCI includes the SRS control information intended for the UE 1, if one bit in the SRS control information intended for the UE 1 is used to instruct the UE 1 to aperiodically send an SRS, and bits other than the one bit in the SRS control information intended for the UE 1 are used to indicate a set of SRS parameters required when the UE 1 aperiodically sends an SRS, the UE 1 sends an SRS to the base station according to the set of SRS parameters required when the UE 1 aperiodically sends an SRS.

S203b4. After the UE 1 detects that the DCI includes the SRS control information intended for the UE 1, if one bit in the SRS control information intended for the UE 1 is used to instruct the UE 1 to aperiodically send an SRS, and bits other than the one bit in the SRS control information intended for the UE 1 are used to instruct the UE 1 not to send an SRS, the UE 1 determines not to send an SRS to the base station.

Figure 5:
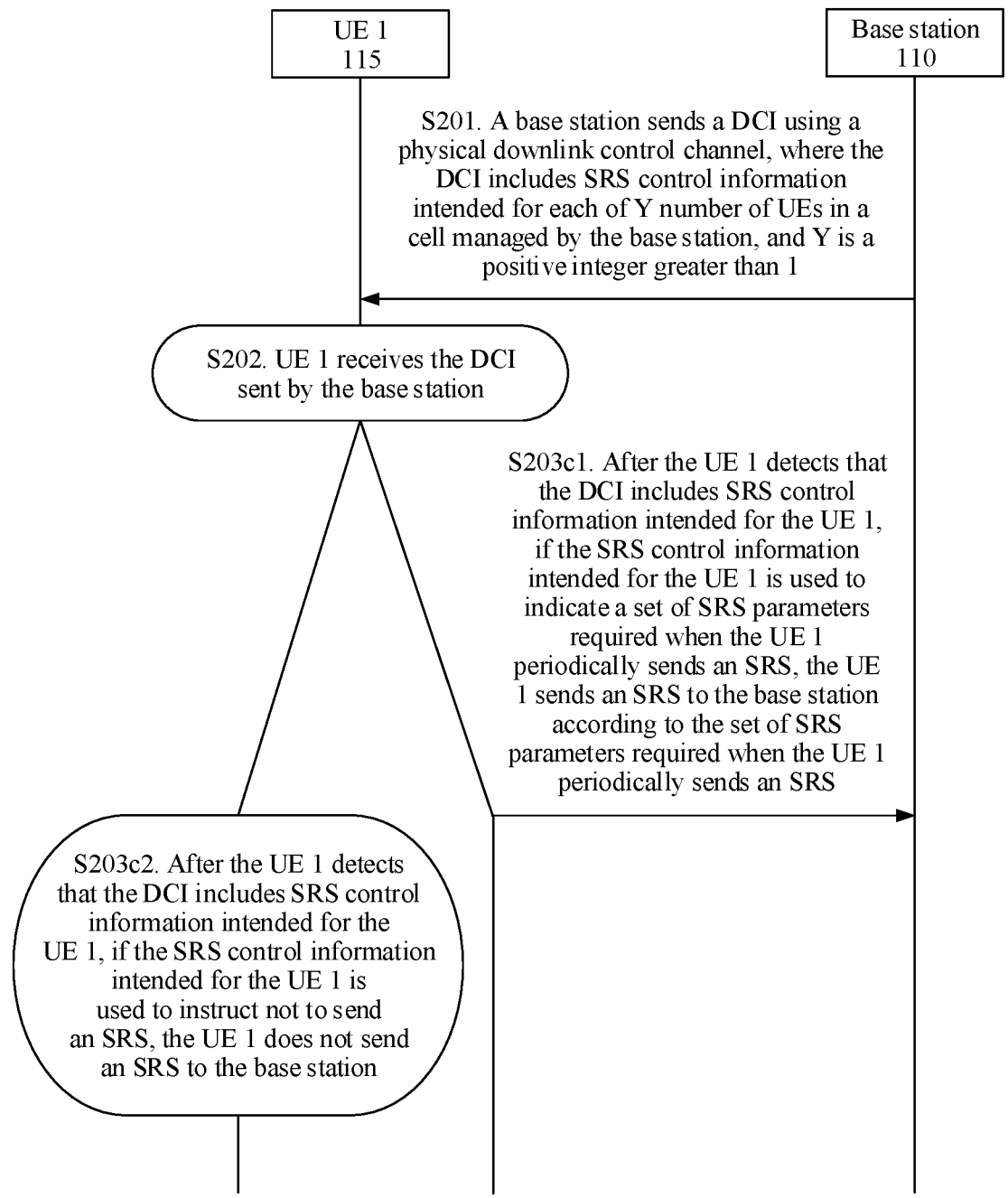
FIG. 5 is an interaction diagram of an uplink sounding signal triggering method according to an embodiment.

When the $2^{k_i}$ combination states represented by the $k_i$ bits in the SRS control information intended for the $i^{th}$ UE are corresponding to the indication manner 3, as shown in FIG. 5, that the UE 1 triggers, after detecting that the DCI includes SRS control information intended for the UE 1, an SRS according to the SRS control information intended for the UE 1 (step S203) may specifically include step S203c1 or S203c2.

S203c1. After the UE 1 detects that the DCI includes the SRS control information intended for the UE 1, if the SRS control information intended for the UE 1 is used to indicate a set of SRS parameters required when the UE 1 periodically sends an SRS, the UE 1 sends an SRS to the base station according to the set of SRS parameters required when the UE 1 periodically sends an SRS.

S203c2. After the UE 1 detects that the DCI includes the SRS control information intended for the UE 1, if the SRS control information intended for the UE 1 is used to instruct not to send an SRS, the UE 1 does not send an SRS to the base station.

When the $2^{k_i}$ combination states represented by the $k_i$ bits in the SRS control information intended for the $i^{th}$ UE are corresponding to the indication manner 2, if the one bit in the SRS control information intended for the UE 1 is used to instruct the UE 1 to periodically send an SRS, before the UE 1 sends an SRS to the base station according to the set of SRS parameters required when the UE 1 periodically sends an SRS, or before the UE 1 does not send an SRS to the base station, the method may further include:

receiving, by the UE 1, RRC 2 signaling sent by the base station, where the RRC 2 signaling includes a first indicator, and the first indicator is used to indicate that a periodic SRS is triggered using the DCI.

Further, if the one bit in the SRS control information intended for the UE 1 is used to instruct the UE 1 to periodically send an SRS, that the UE 1 sends an SRS to the base station according to the set of SRS parameters required when the UE 1 periodically sends an SRS may specifically include:

if the one bit in the SRS control information intended for the UE 1 is used to instruct the UE 1 to periodically send an SRS, sending, by the UE 1, an SRS to the base station according to the first indicator and the set of SRS parameters required when the UE 1 periodically sends an SRS.

If the one bit in the SRS control information intended for the UE 1 is used to instruct the UE 1 to periodically send an SRS, that the UE 1 does not send an SRS to the base station may specifically include:

if the one bit in the SRS control information intended for the UE 1 is used to instruct the UE 1 to periodically send an SRS, not sending, by the UE 1, an SRS to the base station according to the first indicator.

Similarly, when the $2^{k_i}$ combination states represented by the $k_i$ bits in the SRS control information intended for the $i^{th}$ UE are corresponding to the indication manner 3, before the UE 1 sends an SRS to the base station according to the set of SRS parameters required when the UE 1 periodically sends an SRS, or before the UE 1 does not send an SRS to the base station, the method may further include:

receiving, by the UE 1, RRC 2 signaling sent by the base station, where the RRC 2 signaling includes a first indicator, and the first indicator is used to indicate that a periodic SRS is triggered using the DCI.

Further, that the UE 1 sends an SRS to the base station according to the set of SRS parameters required when the UE 1 periodically sends an SRS may specifically include:

sending, by the UE 1, an SRS to the base station according to the first indicator and the set of SRS parameters required when the UE 1 periodically sends an SRS.

That the UE 1 does not send an SRS to the base station may specifically include:

not sending, by the UE 1, an SRS to the base station according to the first indicator.

That is, a difference from a periodic SRS trigger mechanism in the prior art lies in that, in this embodiment, the periodic SRS is triggered using the DCI. DCI-based configuration is dynamic configuration, and the SRS can be reconfigured or the configuration can be stopped in a timely manner. Therefore, a flexible configuration requirement can be met.

It should be noted that the RRC 2 signaling in this embodiment may be specifically RRC signaling obtained by adding the first indicator to existing RRC signaling. In this case, the RRC 2 signaling may carry an SRS parameter delivered by the base station to the UE 1. Certainly, alternatively, the RRC 2 signaling may be newly defined signaling, and is used to carry the first indicator. In this case, the RRC 2 signaling does not carry an SRS parameter delivered by the base station to the UE 1, and is independently delivered RRC signaling. This is not specifically limited in this embodiment.

Figure 6:
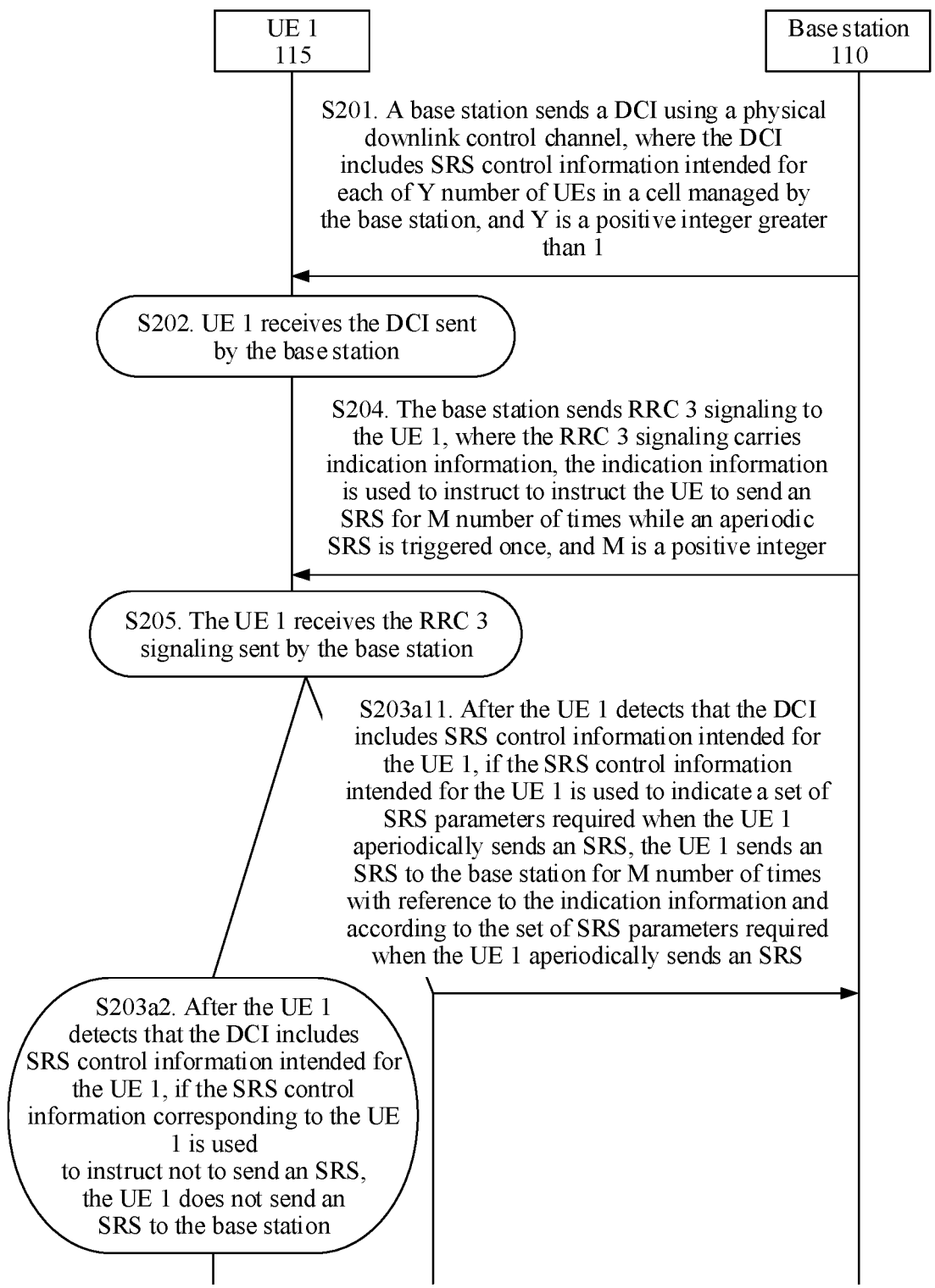
FIG. 6 is an interaction diagram of an uplink sounding signal triggering method according to an embodiment.

Optionally, based on the embodiment shown in FIG. 3, when the uplink sounding signal triggering method provided in this embodiment is used to trigger an aperiodic SRS, as shown in FIG. 6, the method may further include steps S204 and S205.

S204. The base station sends RRC 3 signaling to the UE 1, where the RRC 3 signaling carries indication information, the indication information is used to instruct the UE to transmit an SRS transmission for M number of times while an aperiodic SRS is triggered once, where M is a positive integer not less than 1.

S205. The UE 1 receives the RRC 3 signaling sent by the base station.

Optionally, that after the UE 1 detects that the DCI includes the SRS control information intended for the UE 1, if the SRS control information intended for the UE 1 is used to indicate a set of SRS parameters required when the UE 1 aperiodically sends an SRS, the UE 1 sends an SRS to the base station according to the set of SRS parameters required when the UE 1 aperiodically sends an SRS (step S203a1) may specifically include:

S203a11. After the UE 1 detects that the DCI includes the SRS control information intended for the UE 1, if the SRS control information intended for the UE 1 is used to indicate the set of SRS parameters required when the UE 1 aperiodically sends an SRS, the UE 1 sends an SRS to the base station for M number of times with reference to the indication information and according to the set of SRS parameters required when the UE 1 aperiodically sends an SRS.

Figure 7A:
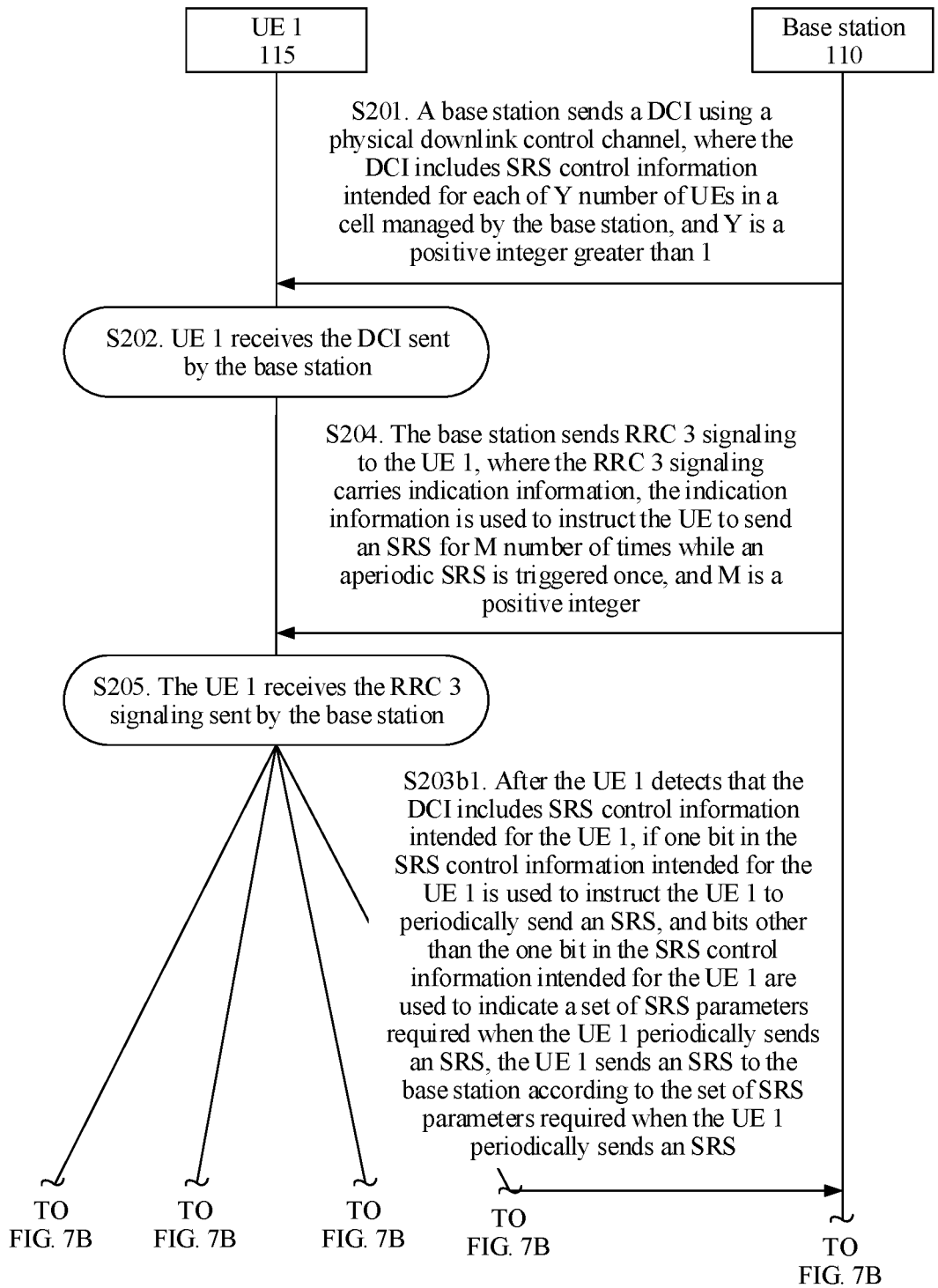
FIG. 7A and FIG. 7B are an interaction diagram of an uplink sounding signal triggering method according to an embodiment.
Figure 7B:
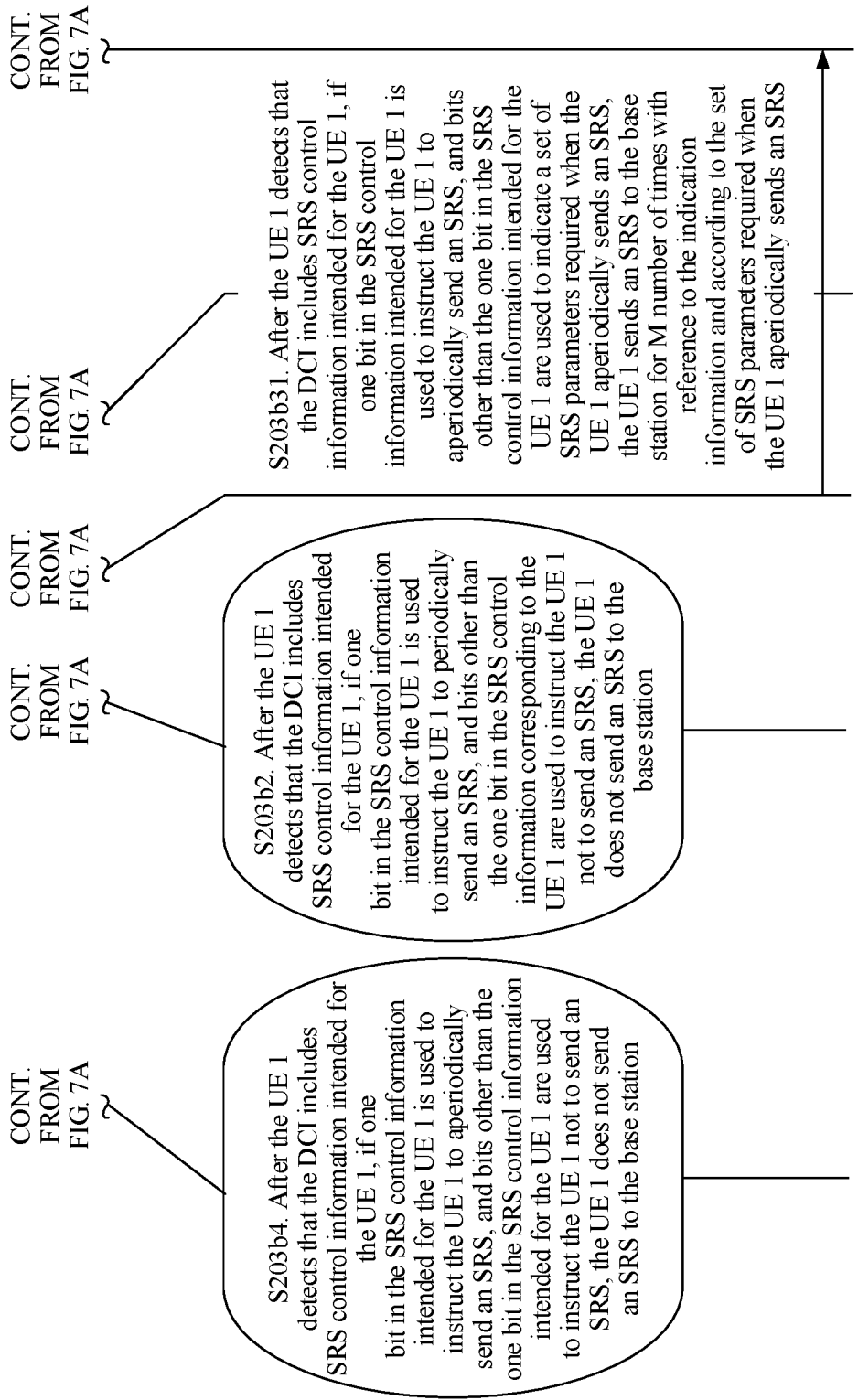

Alternatively, based on the embodiment shown in FIG. 4A and FIG. 4B, when the uplink sounding signal triggering method provided in this embodiment is used to trigger an aperiodic SRS, as shown in FIG. 7A and FIG. 7B, the method may further include steps S204 and S205.

S204. The base station sends RRC 3 signaling to the UE 1, where the RRC 3 signaling carries indication information, the indication information is used to instruct the UE to transmit an SRS transmission for M number of times while an aperiodic SRS is triggered once, where M is a positive integer not less than 1.

S205. The UE 1 receives the RRC 3 signaling sent by the base station.

Optionally, that after the UE 1 detects that the DCI includes the SRS control information intended for the UE 1, if one bit in the SRS control information intended for the UE 1 is used to instruct the UE 1 to aperiodically send an SRS, and bits other than the one bit in the SRS control information intended for the UE 1 are used to indicate a set of SRS parameters required when the UE 1 aperiodically sends an SRS, the UE 1 sends an SRS to the base station according to the set of SRS parameters required when the UE 1 aperiodically sends an SRS (step S203b3) may specifically include:

S203b31. After the UE 1 detects that the DCI includes the SRS control information intended for the UE 1, if the one bit in the SRS control information intended for the UE 1 is used to instruct the UE 1 to aperiodically send an SRS, and the bits other than the one bit in the SRS control information intended for the UE 1 are used to indicate the set of SRS parameters required when the UE 1 aperiodically sends an SRS, the UE 1 sends an SRS to the base station for M number of times with reference to the indication information and according to the set of SRS parameters required when the UE 1 aperiodically sends an SRS.

That is, when the uplink sounding signal triggering method provided in this embodiment is used to trigger the aperiodic SRS, the SRS may be triggered for M number of times using the DCI. This can reduce DCI signaling and reduce signaling overheads compared with a prior-art manner in which a DCI can be used to trigger only one UE to send an SRS once when an aperiodic SRS is triggered.

It should be noted that the RRC 3 signaling in this embodiment may be specifically RRC signaling obtained by adding the indication information to existing RRC signaling. In this case, the RRC 3 signaling may carry an SRS parameter delivered by the base station to the UE 1. Certainly, alternatively, the RRC 3 signaling may be newly defined signaling, and is used to carry the indication information. In this case, the RRC 3 signaling does not carry an SRS parameter delivered by the base station to the UE 1, and is independently delivered RRC signaling. This is not specifically limited in this embodiment.

It should be noted that step S204 and step S201 in this embodiment are not performed in a necessary sequence. Step S204 may be performed before step S201; step S201 may be performed before step S204; or step S204 and step S201 may be performed simultaneously. This is not specifically limited in this embodiment.

Based on the uplink sounding signal triggering method provided in this embodiment, in this embodiment, because the DCI sent by the base station using the physical downlink control channel includes the SRS control information intended for each of the Y number of UEs in the cell managed by the base station, after the UE 1 receives the DCI sent by the base station, and detects that the DCI includes the SRS control information intended for the UE 1, the UE 1 can trigger an SRS according to the SRS control information intended for the UE 1, where Y is a positive integer not less than 2. That is, the DCI in this embodiment can be used to trigger a plurality of UEs to send an SRS once. Therefore, when an SRS needs to be rapidly configured for a plurality of UEs in a short time in a wireless communications system, signaling overheads of a physical layer PDCCH/ePDCCH can be reduced. A difference from a periodic SRS trigger mechanism in the prior art lies in that, in this embodiment, regardless of the periodic SRS or the aperiodic SRS, the SRS is triggered using the DCI. DCI-based configuration is dynamic configuration, and the SRS can be reconfigured or the configuration can be stopped in a timely manner. Therefore, a flexible configuration requirement can be met.

Figure 8:
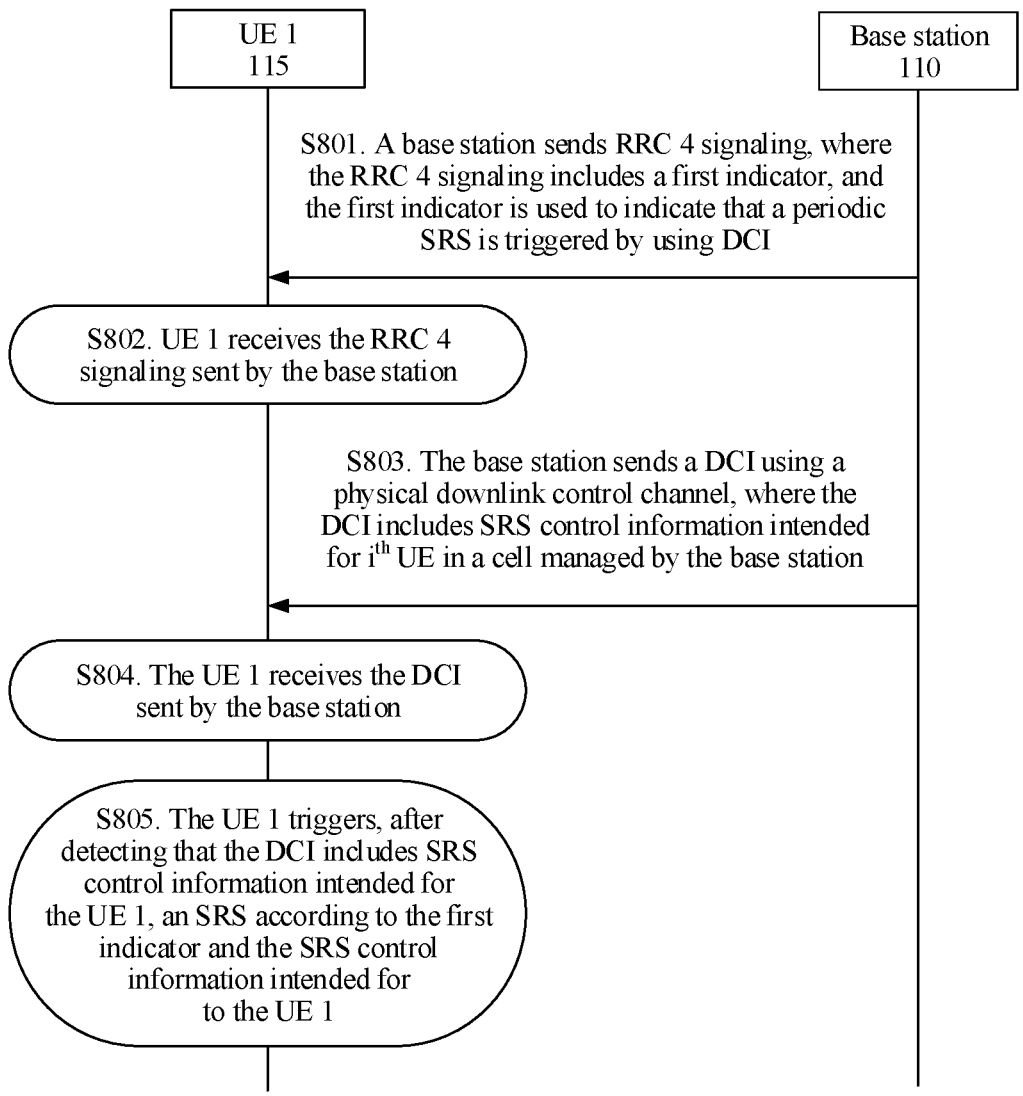
FIG. 8 is an interaction diagram of an uplink sounding signal triggering method according to an embodiment.

Based on the uplink sounding signal triggering system shown in FIG. 1, an embodiment provides an uplink sounding signal triggering method. Interaction between a base station and UE 1 is used as an example for description, and the UE 1 is any UE in a cell managed by the base station. As shown in FIG. 8, the method includes steps S801 to S805.

S801. The base station sends RRC 4 signaling, where the RRC 4 signaling includes a first indicator, and the first indicator is used to indicate that a periodic SRS is triggered using DCI.

S802. The UE 1 receives the RRC 4 signaling sent by the base station.

S803. The base station sends a DCI using a physical downlink control channel, where the DCI includes SRS control information intended for $i^{th}$ UE in a cell managed by the base station.

$1 \leq i \leq N$, N is a total quantity of UEs in the cell managed by the base station, and both i and N are positive integers.

S804. The UE 1 receives the DCI sent by the base station.

S805. The UE 1 triggers, after detecting that the DCI includes SRS control information intended for the UE 1, an SRS according to the first indicator and the SRS control information intended for the UE 1.

In step S801 in this embodiment, details are as follows:

It should be noted that the RRC 4 signaling in this embodiment may be specifically RRC signaling obtained by adding the first indicator to existing RRC signaling. In this case, the RRC 4 signaling may carry an SRS parameter delivered by the base station to the UE 1. Certainly, alternatively, the RRC 4 signaling may be newly defined signaling, and is used to carry the first indicator. In this case, the RRC 4 signaling does not carry an SRS parameter delivered by the base station to the UE 1, and is independently delivered RRC signaling. This is not specifically limited in this embodiment.

In steps S803 to S805 in this embodiment, details are as follows:

When the UE 1 receives the DCI in a scenario in which the DCI may be used to trigger an aperiodic SRS or a periodic SRS, to determine whether the UE 1 is to trigger the aperiodic SRS or the periodic SRS, this embodiment provides two implementations.

In a first possible implementation, indication may be performed using one bit in the SRS control information intended for the UE.

Specifically, it is assumed that a bit quantity of the SRS control information intended for the $i^{th}$ UE is $k_i$. For a specific indication manner of $2^{k_i}$ combination states represented by $k_i$ bits, refer to the indication manner 2 in the embodiment shown in FIG. 2. Details are not described herein again in this embodiment.

When the $2^{k_i}$ combination states represented by the $k_i$ bits in the SRS control information intended for the $i^{th}$ UE are corresponding to the indication manner 2, for specific implementation of step S805 that the UE 1 triggers, after detecting that the DCI includes SRS control information intended for the UE 1, an SRS according to the first indicator and the SRS control information intended for the UE 1, refer to the embodiment shown in FIG. 4A and FIG. 4B. Details are not described herein again in this embodiment.

In a second possible implementation, two RNTIs may be configured for the UE, one RNTI is corresponding to the periodic SRS, and the other is corresponding to the aperiodic SRS. When the base station triggers the periodic SRS, the UE uses the RNTI corresponding to the periodic SRS; and when the base station triggers the aperiodic SRS, the UE uses the RNTI corresponding to the aperiodic SRS.

Specifically, a CRC of the DCI is scrambled using a first RNTI or a second RNTI, the first RNTI is an RNTI corresponding to periodically sending an SRS by the $i^{th}$ UE in the cell managed by the base station, and the second RNTI is an RNTI corresponding to aperiodically sending an SRS by the $i^{th}$ UE in the cell managed by the base station.

Further, that the UE 1 triggers, after detecting that the DCI includes SRS control information intended for the UE 1, an SRS according to the first indicator and the SRS control information intended for the UE 1 (step S801) may specifically include:

if the UE 1 detects, using the first RNTI, that the DCI includes the SRS control information intended for the UE 1, and the SRS control information intended for the UE 1 is used to indicate a set of SRS parameters required when the UE 1 periodically sends an SRS, sending, by the UE 1, an SRS to the base station according to the first indicator and the set of SRS parameters required when the UE 1 periodically sends an SRS; or if the UE 1 detects, using the first RNTI, that the DCI includes the SRS control information intended for the UE 1, and the SRS control information intended for the UE 1 is used to instruct the UE 1 not to send an SRS, not sending, by the UE 1, an SRS to the base station according to the first indicator; or if the UE 1 detects, using the second RNTI, that the DCI includes the SRS control information intended for the UE 1, and the SRS control information intended for the UE 1 is used to indicate a set of SRS parameters required when the UE 1 aperiodically sends an SRS, sending, by the UE 1, an SRS to the base station according to the first indicator and the set of SRS parameters required when the UE 1 aperiodically sends an SRS; or if the UE 1 detects, using the second RNTI, that the DCI includes the SRS control information intended for the UE 1, and the SRS control information intended for the UE 1 is used to instruct the UE 1 not to send an SRS, not sending, by the UE 1, an SRS to the base station according to the first indicator.

It should be noted that the foregoing embodiment describes an example in which the DCI may be used to trigger the aperiodic SRS or the periodic SRS. Certainly, alternatively, the DCI may be used to trigger only the periodic SRS. This is not specifically limited in this embodiment.

When the DCI is used to trigger only the periodic SRS, for a specific indication manner of $2^{k_i}$ combination states represented by $k_i$ bits in the SRS control information intended for the i$^{th}$ UE, refer to the indication manner 3 in the embodiment shown in FIG. 2. This is not specifically limited in this embodiment.

Preferably, the base station may configure an SRS parameter of a new transmission mode (which may be denoted as a type 2) for the UE, and the SRS parameter is a periodic SRS parameter, and may be triggered using a DCI format 0/4/1A and a DCI format 2B/2C/2D in an existing protocol.

When higher layer RRC signaling is used to configure a set of SRS parameters of the type 2 for each UE, and 1 bit in the DCI format 0/1A/2B/2C/2D is used to trigger the set of SRS, "1" indicates triggering the type 2 mode to send the periodic SRS, and "0" indicates not sending the periodic SRS; or "0" indicates triggering the type 2 mode to send the periodic SRS, and "1" indicates not sending the periodic SRS. This is not specifically limited in this embodiment.

When 2 bits in the DCI format 4 are used to trigger configuration, for each UE, of an SRS parameter of the type 2, as shown in Table 1, a reserved state "00" indicates not sending the periodic SRS, and other states indicate a set of SRS parameters required when the periodic SRS is triggered.

The foregoing scenario is not specifically limited in this embodiment.

It should be noted that a manner of configuring the SRS parameter of the new transmission mode: type 2 for the UE is also applicable to the embodiments in which the periodic SRS is triggered. Details are not described herein in this embodiment.

A difference from a periodic SRS trigger mechanism in the prior art lies in that, in this embodiment, the base station sends the RRC 4 signaling, the RRC 4 signaling includes the first indicator, and the first indicator is used to indicate that an SRS is triggered using the DCI. In this way, after the UE 1 receives the DCI that is sent by the base station and that includes the SRS control information intended for the i$^{th}$ UE in the cell managed by the base station, and detects that the DCI includes the SRS control information intended for the UE 1, the UE 1 can trigger an SRS according to the first indicator and the SRS control information intended for the UE 1. DCI-based configuration is dynamic configuration, and the SRS can be reconfigured or the configuration can be stopped in a timely manner. Therefore, a flexible configuration requirement can be met.

Figure 9:
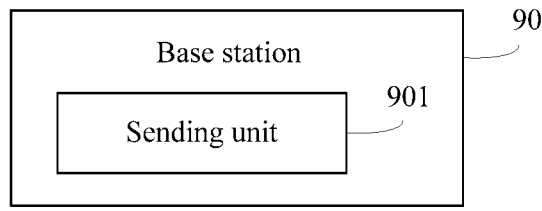
FIG. 9 is a diagram of a BS according to an embodiment.

As shown in FIG. 9, an embodiment provides an apparatus, the apparatus may be a base station 90, and the base station 90 is configured to perform the steps performed by the base station in the methods shown in FIG. 2 to FIG. 7A and FIG. 7B. The base station 90 may include modules corresponding to the corresponding steps. For example, the base station 90 may include:

a sending unit 901, configured to send a DCI using a physical downlink control channel, where the DCI includes SRS control information intended for each of Y number of UEs in a cell managed by the base station 90, and Y is a positive integer not less than 2.

Optionally, a bit quantity of SRS control information intended for i$^{th}$ UE in the Y number of UEs is $k_i$, comprises an integer according to $1 \le i \le Y$, and $k_i$ is a positive integer not less than 1.

In this embodiment, for different application scenarios, $2^{k_i}$ combination states represented by $k_i$ bits in the SRS control information intended for the i$^{th}$ UE are corresponding to different indication manners. For details, refer to the indication manner 1, the indication manner 2, or the indication manner 3 in the foregoing method embodiment. Details are not described herein again in this embodiment.

Optionally, the sending unit 901 is further configured to send first RRC signaling to the UE, where the first RRC signaling includes a first indicator, and the first indicator is used to indicate that a periodic SRS is triggered using the DCI.

Optionally, the sending unit 901 is further configured to send second RRC signaling to the UE, where the second RRC signaling carries a correspondence between a bit location in the DCI and each of the Y number of UEs.

Optionally, the sending unit 901 is further configured to send third RRC signaling to the UE, where the third RRC signaling carries indication information, the indication information is used to instruct the UE to transmit an SRS transmission for M number of times while an aperiodic SRS is triggered once, where M is a positive integer not less than 1.

It may be understood that the base station 90 in this embodiment may be corresponding to the base station in the uplink channel sounding method in the embodiment in any one of FIG. 2 to FIG. 7A and FIG. 7B, and division and/or functions, and the like of the modules of the base station 90 in this embodiment are intended to implement the method procedures shown in any one of FIG. 2 to FIG. 7A and FIG. 7B. For brevity, details are not described herein again.

The base station 90 in this embodiment may be configured to perform the foregoing method procedures. Therefore, for technical effects that can be achieved by the base station 90, refer to the foregoing method embodiments. Details are not described herein again in this embodiment.

Figure 10:
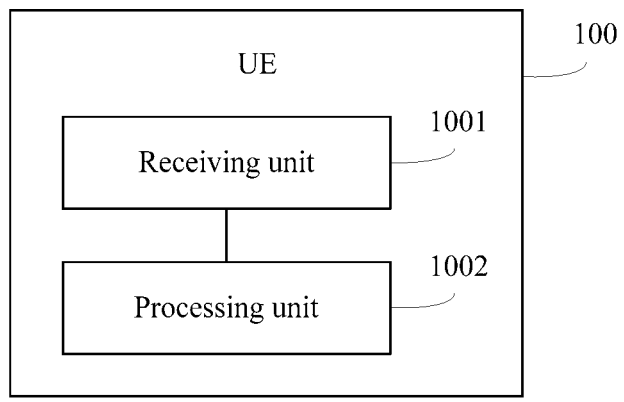
FIG. 10 is a diagram of UE according to an embodiment.

As shown in FIG. 10, an embodiment provides an apparatus, the apparatus may be UE 100, and the UE 100 is configured to perform the steps performed by the UE in the methods shown in FIG. 2 to FIG. 7A and FIG. 7B. The UE 100 may include modules corresponding to the corresponding steps. For example, the UE 100 may include:

a receiving unit 1001, configured to receive a DCI sent by a base station, where the DCI includes SRS control information intended for each of Y user equipments UEs in a cell managed by the base station, and Y is a positive integer not less than 2; and a processing unit 1002, configured to trigger, after it is detected that the DCI includes SRS control information intended for the UE 100, an SRS according to the SRS control information intended for the UE 100.

Optionally, a bit quantity of SRS control information intended for i$^{th}$ UE in the Y number of UEs is $k_i$, i comprises an integer according to $1 \le i \le Y$, and $k_i$ is a positive integer not less than 1.

In this embodiment, for different application scenarios, $2^{k_i}$ combination states represented by $k_i$ bits in the SRS control information intended for the $i^{th}$ UE are corresponding to different indication manners. For details, refer to the indication manner 1, the indication manner 2, or the indication manner 3 in the foregoing method embodiment. Details are not described herein again in this embodiment.

Figure 11:
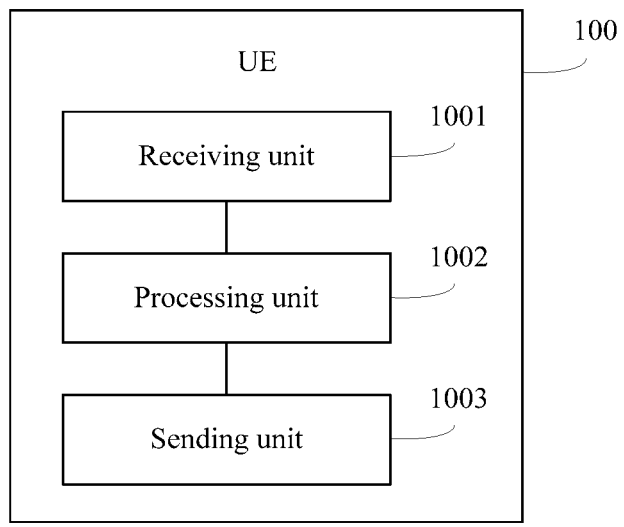
FIG. 11 is a diagram of a UE according to an embodiment.

Optionally, as shown in FIG. 11, the UE 100 further includes a sending unit 1003.

For the indication manner 1, the processing unit 1002 is specifically configured to:

if the SRS control information intended for the UE 100 is used to indicate a set of SRS parameters required when the UE 100 aperiodically sends an SRS, send an SRS to the base station using the sending unit 1003 and according to the set of SRS parameters required when the UE 100 aperiodically sends an SRS; or if the SRS control information intended for the UE 100 is used to instruct not to send an SRS, not sending an SRS to the base station.

Alternatively, for the indication manner 2, the processing unit 1002 is specifically configured to:

if one bit in the SRS control information intended for the UE 100 is used to instruct the UE 100 to periodically send an SRS, and bits other than the one bit in the SRS control information intended for the UE 100 are used to indicate a set of SRS parameters required when the UE 100 periodically sends an SRS, send an SRS to the base station using the sending unit 1003 and according to the set of SRS parameters required when the UE 100 periodically sends an SRS; or if one bit in the SRS control information intended for the UE 100 is used to instruct the UE 100 to periodically send an SRS, and bits other than the one bit in the SRS control information intended for the UE 100 are used to instruct the UE 100 not to send an SRS, not sending an SRS to the base station; or if one bit in the SRS control information intended for the UE 100 is used to instruct the UE 100 to aperiodically send an SRS, and bits other than the one bit in the SRS control information intended for the UE 100 are used to indicate a set of SRS parameters required when the UE 100 aperiodically sends an SRS, send an SRS to the base station using the sending unit 1003 and according to the set of SRS parameters required when the UE 100 aperiodically sends an SRS; or if one bit in the SRS control information intended for the UE 100 is used to instruct the UE 100 to aperiodically send an SRS, and bits other than the one bit in the SRS control information intended for the UE 100 are used to instruct the UE 100 not to send an SRS, not sending an SRS to the base station.

Alternatively, for the indication manner 3, the processing unit 1002 is specifically configured to:

if the SRS control information intended for the UE 100 is used to indicate a set of SRS parameters required when the UE 100 periodically sends an SRS, send an SRS to the base station using the sending unit 1003 and according to the set of SRS parameters required when the UE 100 periodically sends an SRS; or if the SRS control information intended for the UE 100 is used to instruct not to send an SRS, not sending an SRS to the base station.

Optionally, for the indication manner 2, the receiving unit 1001 is further configured to: if the one bit in the SRS control information intended for the UE 100 is used to instruct the UE 100 to periodically send an SRS, before the processing unit 1002 sends an SRS to the base station using the sending unit 1003 and according to the set of SRS parameters required when the UE 100 periodically sends an SRS, or before the processing unit 1002 does not send an SRS to the base station, receive second RRC signaling sent by the base station, where the second RRC signaling includes a first indicator, and the first indicator is used to indicate that a periodic SRS is triggered using the DCI.

Further, the processing unit 1002 is specifically configured to:

if the one bit in the SRS control information intended for the UE 100 is used to instruct the UE 100 to periodically send an SRS, send an SRS to the base station using the sending unit 1003 and according to the first indicator and the set of SRS parameters required when the UE 100 periodically sends an SRS, or not sending an SRS to the base station according to the first indicator.

Optionally, the receiving unit 1001 is further configured to receive first RRC signaling sent by the base station, where the first RRC signaling carries a correspondence between a bit location in the DCI and each of the Y number of UEs; and the processing unit 1002 is further configured to determine, according to the correspondence, the SRS control information intended for the UE 100.

Optionally, the receiving unit 1001 is further configured to receive third RRC signaling sent by the base station, where the third RRC signaling carries indication information, the indication information is used to instruct the UE to transmit an SRS transmission for M number of times while an aperiodic SRS is triggered once, where M is a positive integer not less than 1.

Further, the processing unit 1002 is specifically configured to:

send, using the sending unit 1003, an SRS to the base station for M number of times with reference to the indication information and according to the set of SRS parameters required when the UE 100 aperiodically sends an SRS.

It may be understood that the UE 100 in this embodiment may be corresponding to the UE in the uplink channel sounding method in the embodiment in any one of FIG. 2 to FIG. 7A and FIG. 7B, and division and/or functions, and the like of the modules of the UE 100 in this embodiment are intended to implement the method procedures shown in any one of FIG. 2 to FIG. 7A and FIG. 7B. For brevity, details are not described herein again.

The UE 100 in this embodiment may be configured to perform the foregoing method procedures. Therefore, for technical effects that can be achieved by the UE 100, refer to the foregoing method embodiments. Details are not described herein again in this embodiment.

Optionally, the UE 100 shown in FIG. 10 or FIG. 11 may be further configured to perform the steps performed by the UE in the method shown in FIG. 8. In this case, the receiving unit 1001 is configured to receive RRC signaling sent by a base station, where the RRC signaling includes a first indicator, and the first indicator is used to indicate that a periodic SRS is triggered using downlink control information DCI;

the receiving unit 1001 is further configured to receive a DCI sent by the base station, where the DCI includes SRS control information intended for $i^{th}$ UE in a cell managed by the base station, $1 \leq i \leq N$, N is a total quantity of UEs 100 in the cell managed by the base station, and both i and N are positive integers; and the processing unit 1002 is configured to trigger, after it is detected that the DCI includes SRS control information intended for the UE 100, an SRS according to the first indicator and the SRS control information intended for the UE 100.

Optionally, $2^{k_i}$ combination states represented by $k_i$ bits in the SRS control information intended for the $i^{th}$ UE may be indicated in the indication manner 2 in the foregoing method embodiment. Details are not described herein again in this embodiment.

Further, the processing unit 1002 is specifically configured to:

if one bit in the SRS control information intended for the UE 100 is used to instruct the UE 100 to periodically send an SRS, and bits other than the one bit in the SRS control information intended for the UE 100 are used to indicate a set of SRS parameters required when the UE 100 periodically sends an SRS, send an SRS to the base station using the sending unit 1003 and according to the first indicator and the set of SRS parameters required when the UE 100 periodically sends an SRS; or if one bit in the SRS control information intended for the UE 100 is used to instruct the UE 100 to periodically send an SRS, and bits other than the one bit in the SRS control information intended for the UE 100 are used to instruct the UE 100 not to send an SRS, not sending an SRS to the base station according to the first indicator; or if one bit in the SRS control information intended for the UE 100 is used to instruct the UE 100 to aperiodically send an SRS, and bits other than the one bit in the SRS control information intended for the UE 100 are used to indicate a set of SRS parameters required when the UE 100 aperiodically sends an SRS, send an SRS to the base station using the sending unit 1003 and according to the set of SRS parameters required when the UE 100 aperiodically sends an SRS; or if one bit in the SRS control information intended for the UE 100 is used to instruct the UE 100 to aperiodically send an SRS, and bits other than the one bit in the SRS control information intended for the UE 100 are used to instruct the UE 100 not to send an SRS, not sending an SRS to the base station.

Optionally, a CRC of the DCI is scrambled using a first RNTI or a second RNTI, the first RNTI is an RNTI corresponding to periodically sending an SRS by the $i^{th}$ UE in the cell managed by the base station, and the second RNTI is an RNTI corresponding to aperiodically sending an SRS by the $i^{th}$ UE in the cell managed by the base station.

Further, the processing unit 1002 is specifically configured to:

if the UE 100 detects, using the first RNTI, that the DCI includes the SRS control information intended for the UE 100, and the SRS control information intended for the UE 100 is used to indicate a set of SRS parameters required when the UE 100 periodically sends an SRS, send an SRS to the base station using the sending unit 1003 and according to the first indicator and the set of SRS parameters required when the UE 100 periodically sends an SRS; or if the UE 100 detects, using the first RNTI, that the DCI includes the SRS control information intended for the UE 100, and the SRS control information intended for the UE 100 is used to instruct the UE 100 not to send an SRS, not sending an SRS to the base station according to the first indicator; or if the UE 100 detects, using the second RNTI, that the DCI includes the SRS control information intended for the UE 100, and the SRS control information intended for the UE 100 is used to indicate a set of SRS parameters required when the UE 100 aperiodically sends an SRS, send an SRS to the base station by using the sending unit 1003 and according to the first indicator and the set of SRS parameters required when the UE 100 aperiodically sends an SRS; or if the UE 100 detects, using the second RNTI, that the DCI includes the SRS control information intended for the UE 100, and the SRS control information intended for the UE 100 is used to instruct the UE 100 not to send an SRS, not sending an SRS to the base station according to the first indicator.

It may be understood that the UE 100 in this embodiment may be corresponding to the UE in the uplink channel sounding method in the embodiment in FIG. 8, and division and/or functions, and the like of the modules of the UE 100 in this embodiment are intended to implement the method procedures shown in FIG. 8. For brevity, details are not described herein again.

The UE 100 in this embodiment may be configured to perform the foregoing method procedures. Therefore, for technical effects that can be achieved by the UE 100, refer to the foregoing method embodiment. Details are not described herein again in this embodiment.

Optionally, the base station 90 shown in FIG. 9 may be further configured to perform the steps performed by the base station 90 in the method shown in FIG. 8. In this case, the sending unit 901 is configured to send RRC signaling, where the RRC signaling includes a first indicator, and the first indicator is used to indicate that an SRS is triggered using DCI; and the sending unit 901 is further configured to send a DCI using a physical downlink control channel, where the DCI includes SRS control information intended for $i^{th}$ UE in a cell managed by the base station 90, $1 \le i \le N$, N is a total quantity of UEs in the cell managed by the base station 90, and both i and N are positive integers.

Optionally, $2^{k_i}$ combination states represented by $k_i$ bits in the SRS control information intended for the $i^{th}$ UE may be indicated in the indication manner 2 in the foregoing method embodiment. Details are not described herein again in this embodiment.

Optionally, a CRC of the DCI is scrambled using a first RNTI or a second RNTI, the first RNTI is an RNTI corresponding to periodically sending an SRS by the $i^{th}$ UE in the cell managed by the base station 90, and the second RNTI is an RNTI corresponding to aperiodically sending an SRS by the $i^{th}$ UE in the cell managed by the base station 90.

It may be understood that the base station 90 in this embodiment may be corresponding to the base station in the uplink channel sounding method in the embodiment in FIG. 8, and division and/or functions, and the like of the modules of the base station 90 in this embodiment are intended to implement the method procedures shown in FIG. 8. For brevity, details are not described herein again.

The base station 90 in this embodiment may be configured to perform the foregoing method procedures. Therefore, for technical effects that can be achieved by the base station 90, refer to the foregoing method embodiment. Details are not described herein again in this embodiment.

Figure 12:
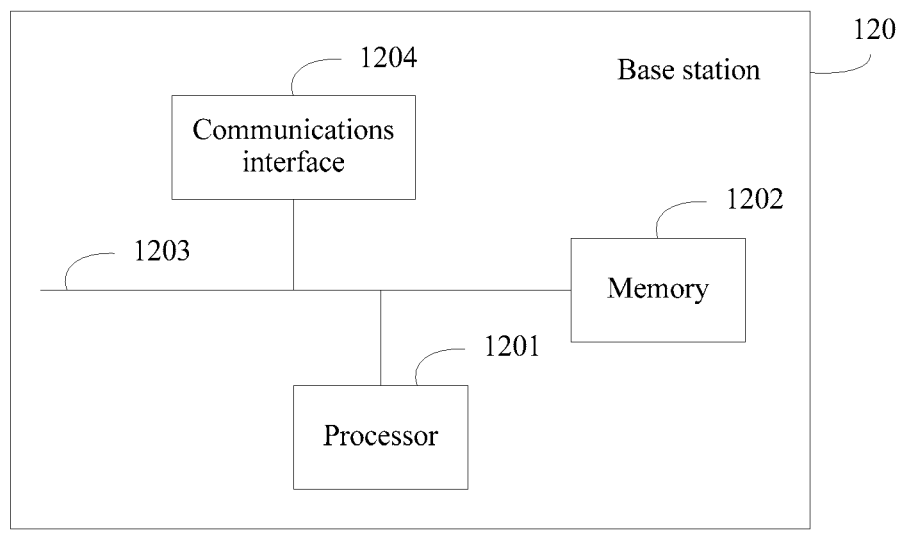
FIG. 12 is a diagram of a BS according to an embodiment.

As shown in FIG. 12, an embodiment provides an apparatus, the apparatus may be a base station 120, and the base station 120 includes a processor 1201, a memory 1202, a system bus 1203, and a communications interface 1204.

The memory 1202 is configured to store a computer executable instruction, the processor 1201 and the memory 1202 are connected using the system bus, and when the base station 120 runs, the processor 1201 executes the computer executable instruction stored in the memory 1202, so that the base station 120 performs the uplink channel sounding method described in any one of FIG. 2 to FIG. 8. For a specific uplink channel sounding method, refer to the related descriptions in the embodiment shown in any one of FIG. 2 to FIG. 8. Details are not described herein again.

This embodiment further provides a storage medium, and the storage medium may include the memory 1202.

The processor 1201 may be a central processing unit (CPU). The processor 1201 may be another general-purpose processor, a digital signal processor (DSP), an application-specific integrated circuit (ASIC), a field-programmable gate array (FPGA), or another programmable logic device, a discrete gate or a transistor logic device, a discrete hardware component, or the like. The general-purpose processor may be a microprocessor, or the processor may be any normal processor, or the like.

The processor 1201 may be a dedicated processor, and the dedicated processor may include at least one of a baseband processing chip, a radio frequency processing chip, or the like. The dedicated processor may further include a chip having another dedicated processing function of the base station 120.

The memory 1202 may include a volatile memory, for example, a random-access memory (RAM); or the memory 1202 may include a non-volatile memory, for example, a read-only memory (ROM), a flash memory, a hard disk drive (HDD), or a solid-state drive (SSD); or the memory 1202 may include a combination of the foregoing types of memories.

The system bus 1203 may include a data bus, a power bus, a control bus, a status signal bus, and the like. In this embodiment, for clear description, various buses in FIG. 12 are marked as the system bus 1203.

The communications interface 1204 may be specifically a transceiver of the base station 120. The transceiver may be a wireless transceiver. For example, the wireless transceiver may be an antenna or the like of the base station 120. The processor 1201 receives data from or sends data to another device such as UE using the communications interface 1204.

In a specific implementation process, the steps in the method procedures shown in any one of FIG. 2 to FIG. 8 may be implemented in a manner in which the processor 1201 in a hardware form executes the computer executable instruction in a software form that is stored in the memory 1202. To avoid repetition, details are not described herein again.

The base station 120 provided in this embodiment may be configured to perform the foregoing method procedures. Therefore, for technical effects that can be achieved by the base station 120, refer to the foregoing method embodiments. Details are not described herein again.

Figure 13:
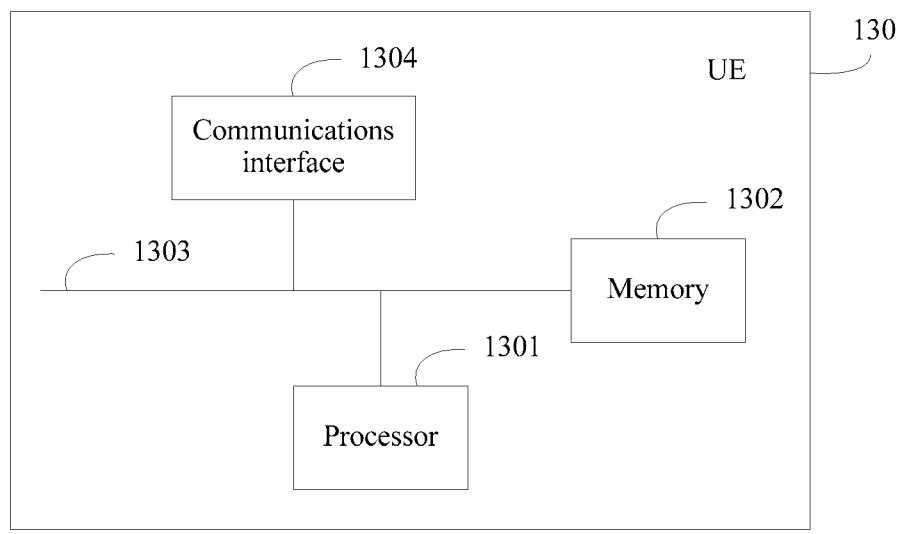
FIG. 13 is a diagram of a UE according to an embodiment.

As shown in FIG. 13, an embodiment provides an apparatus, the apparatus may be UE 130, and the UE 130 includes a processor 1301, a memory 1302, a system bus 1303, and a communications interface 1304.

The memory 1302 is configured to store a computer executable instruction, the processor 1301 and the memory 1302 are connected using the system bus, and when the UE 1302 runs, the processor 1301 executes the computer executable instruction stored in the memory 1303, so that the UE 130 performs the uplink channel sounding method described in any one of FIG. 2 to FIG. 8. For a specific uplink channel sounding method, refer to the related descriptions in the embodiment shown in any one of FIG. 2 to FIG. 8. Details are not described herein again.

This embodiment further provides a storage medium, and the storage medium may include the memory 1302.

The processor 1301 may be a CPU. The processor 1301 may be another general-purpose processor, a DSP, an ASIC, an FPGA, or another programmable logic device, a discrete gate or a transistor logic device, a discrete hardware component, or the like. The general-purpose processor may be a microprocessor, or the processor may be any normal processor, or the like.

The processor 1301 may be a dedicated processor, and the dedicated processor may include at least one of a baseband processing chip, a radio frequency processing chip, or the like. The dedicated processor may further include a chip having another dedicated processing function of the UE 130.

The memory 1302 may include a volatile memory, for example, a random-access memory RAM; or the memory 1302 may include a non-volatile memory, for example, a read-only memory ROM, a flash memory, an HDD, or an SSD; or the memory 1302 may include a combination of the foregoing types of memories.

The system bus 1303 may include a data bus, a power bus, a control bus, a status signal bus, and the like. In this embodiment, for clear description, various buses in FIG. 13 are marked as the system bus 1303.

The communications interface 1304 may be specifically a transceiver of the UE 130. The transceiver may be a wireless transceiver. For example, the wireless transceiver may be an antenna or the like of the UE 130. The processor 1301 receives data from or sends data to another device such as a base station using the communications interface 1304.

In a specific implementation process, the steps in the method procedures shown in any one of FIG. 2 to FIG. 8 may be implemented in a manner in which the processor 1301 in a hardware form executes the computer executable instruction in a software form that is stored in the memory 1302. To avoid repetition, details are not described herein again.

The UE 130 provided in this embodiment may be configured to perform the foregoing method procedures. Therefore, for technical effects that can be achieved by the UE 130, refer to the foregoing method embodiments. Details are not described herein again.

An embodiment provides an uplink sounding signal triggering system, and the uplink sounding signal triggering system includes a base station, and a plurality of UEs in a cell managed by the base station. The uplink sounding signal triggering system shown in FIG. 1 is used as an example, the plurality of UEs may be six UEs, and the six UEs are respectively UE 1, UE 2, UE 3, UE 4, UE 5, and UE 6. For detailed descriptions of the six UEs, refer to the related descriptions of the UE in the embodiments shown in FIG. 10, FIG. 11, and FIG. 13. For detailed descriptions of the base station, refer to the related descriptions of the base station in the embodiments shown in FIG. 9 and FIG. 12. Details are not described herein again.

In the uplink sounding signal triggering system provided in this embodiment, each of the plurality of UEs completes the uplink sounding signal triggering method in the embodiments by performing the corresponding steps in the method procedures shown in any one of FIG. 2 to FIG. 8; correspondingly, the base station completes the uplink sounding signal triggering method in the embodiments by performing the corresponding steps in the method procedures shown in any one of FIG. 2 to FIG. 8.

The uplink sounding signal triggering system provided in this embodiment includes the UE shown in FIG. 10, FIG. 11, or FIG. 13 and the base station shown in FIG. 9 or FIG. 12, the UE shown in FIG. 10, FIG. 11, or FIG. 13 and the base station shown in FIG. 9 or FIG. 12 may be configured to perform the method procedures shown in any one of FIG. 2 to FIG. 8. Therefore, for technical effects that can be achieved by the system, refer to the descriptions in the method embodiments. Details are not described herein again in this embodiment.

It may be clearly understood by a person skilled in the art that, for the purpose of convenient and brief description, in the apparatus described above, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments. The foregoing storage medium includes any medium that can store program code, such as a USB flash drive, a removable hard disk, a ROM, a RAM, a magnetic disk, or an optical disc.

Further embodiments of the present application are provided in the following. It should be noted that the numbering of these embodiments used in the following section does not necessarily need to comply with the numbering used in the previous sections.

1. An uplink sounding signal triggering method, the method comprising:

generating, by a base station, a downlink control information (DCI), with the DCI including a sounding reference signal (SRS) control information intended for each user equipment (UE) of Y number of UEs, with Y comprising a positive integer greater than 1;

sending, by a base station, the downlink control information (DCI) using a physical downlink control channel (PDCCH).

2. The method according to embodiment 1, wherein a bit quantity of SRS control information intended for an $i^{th}$ UE in the Y number of UEs is $1 \leq i \leq Y$, with i comprising an integer according to $1 \leq i \leq Y$, and with $k_i$ comprising a positive integer.

3. The method according to embodiment 1, further comprising:

sending, by the base station, a bit location in the DCI of a UE in the Y number of UEs to the UE.

4. The method according to embodiment 3, wherein the bit location in the DCI of the UE is carried in a radio resource control (RRC) signaling.

5. The method according to embodiment 3, wherein the bit location in the DCI of the UE comprises a start location.

6. The method according to embodiment 2, wherein $s_i$ states in $2^{k_i}$ states represented by $k_i$ bits in the SRS control information intended for the $i^{th}$ UE are separately used to indicate a set of SRS parameters required when the UE aperiodically transmits a SRS transmission, and wherein one of states other than the $s_i$ states in the $2^{k_i}$ states is used to instruct the UE to not send an SRS, wherein $1 \leq s_i \leq 2^{k_i}-1$, and wherein $s_i$ is an integer.

7. The method according to embodiment 1, wherein the method further comprises:

sending, by the base station, second RRC signaling to the UE, wherein the second RRC signaling carries a correspondence between a bit location in the DCI and each of the Y number of UEs.

8. The method according to embodiment 1, wherein a cyclic redundancy check (CRC) of the DCI is scrambled by the base station using a radio network temporary identifier (RNTI), with the method further comprising:

sending the RNTI to the Y number of UEs.

9. An uplink sounding signal triggering method, the method comprising:

receiving, by a user equipment (UE), a downlink control information (DCI) from a base station, with the DCI including a sounding reference signal (SRS) control information intended for each UE of Y number of UEs, and with Y comprising a positive integer greater than 1; and triggering, by the UE after detecting that the DCI comprises SRS control information intended for the UE, an SRS transmission according to the SRS control information intended for the UE.

10. The method according to embodiment 9, wherein the method further comprises:

receiving, by the UE, first radio resource control RRC signaling from the base station, wherein the first RRC signaling carries a correspondence between a bit location in the DCI and each UE of the Y number of UEs; and determining, by the UE according to the correspondence, the SRS control information intended for the UE.

11. The method according to embodiment 9, wherein a bit quantity of the SRS control information intended for the $i^{th}$ UE in the Y number of UEs is wherein i comprises an integer according to $1 \leq i \leq Y$, and with $k_i$ comprising a positive integer.

12. The method according to embodiment 9, further comprising:
receiving a bit location in the DCI of the UE from the base station through a radio resource control (RRC) signaling.

13. The method according to embodiment 12, wherein the bit location in the DCI of the UE comprises a start location.

14. The method according to embodiment 9, wherein the method further comprises:
receiving, by the UE, a third RRC signaling from the base station, wherein the third RRC signaling carries indication information, the indication information instructing the UE to transmit an SRS transmission for M number of times while an aperiodic SRS is triggered once, with M comprising a positive integer; and
transmitting, by the UE, the SRS transmission to the base station for the M number of times with reference to the indication information and according to the set of SRS parameters required when the UE aperiodically sends an SRS.

15. A user equipment (UE), comprising:
a memory storage comprising instructions;
a communication interface receiving a downlink control information (DCI) from a base station, with the DCI comprising a sounding reference signal (SRS) control information intended for each UE of Y number of UEs, and with Y comprising a positive integer greater than 1; and
a processor in communication with the memory and the communication interface, wherein the processor executes the instructions to trigger, after detecting that the DCI comprises SRS control information intended for the UE, an SRS transmission according to the SRS control information intended for the UE.

16. The UE according to embodiment 15, further comprising:
the communication interface receiving a first radio resource control (RRC) signaling from the base station, wherein the first RRC signaling carries a correspondence between a bit location in the DCI and each UE of the Y number of UEs; and
determining, according to the correspondence, the SRS control information intended for the UE.

17. The UE according to embodiment 15, wherein a bit quantity of SRS control information intended for $i^{th}$ UE in the Y number of UEs is with i comprising an integer according to $1 \leq i \leq Y$, and with $k_i$ comprising a positive integer.

18. The UE according to embodiment 15, with the processor further executing the instructions to:
receive a bit location in the DCI of the UE from the base station through a radio resource control (RRC) signaling.

19. The UE according to embodiment 18, wherein the bit location in the DCI of the UE comprises a start location.

20. The UE according to embodiment 15, further comprising:
the communication interface receiving a third RRC signaling from the base station, wherein the third RRC signaling carries indication information instructing the UE to transmit an SRS transmission for M number of times while an aperiodic SRS is triggered once, where M is a positive integer; and
transmitting, by the UE, the SRS transmission to the base station for the M number of times with reference to the indication information and according to the set of SRS parameters required when the UE aperiodically sends an SRS.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A communication method, carried out by a user equipment (UE), the method comprising:
receiving a downlink control information (DCI) from a base station by detecting that a cyclic redundancy check (CRC) of the DCI has been scrambled using a radio network temporary identifier (RNTI) received from the base station, wherein the DCI comprises a sounding reference signal (SRS) control information intended for each UE of Y number of UEs, where Y is a positive integer greater than 1, where a bit quantity of the SRS control information intended for an $i^{th}$ UE in the Y number of UEs is $k_i$, where i is an integer according to the expression $1 \leq i \leq Y$, and where $k_i$ is a positive integer;
obtaining an SRS control information intended for the UE from the DCI in response to the CRC of the DCI being scrambled using the RNTI received from the base station; and
triggering an SRS transmission according to the SRS control information.

2. The method according to claim 1, further comprising:
receiving an information about a bit location of the SRS control information from the base station through a first radio resource control (RRC) signaling, wherein the information about the bit location signals where the SRS control information is located in the DCI.

3. The method according to claim 2, wherein the information about the bit location comprises an information about a start location.

4. The method according to claim 1, further comprising:
receiving a third RRC signaling from the base station, the third RRC signaling carrying indication information, the indication information instructing the UE to transmit the SRS transmission for an M number of times while an aperiodic type of SRS transmission is triggered once, where M comprises a positive integer, and wherein the SRS transmission is the aperiodic type of SRS transmission; and
triggering the SRS transmission according to the SRS control information comprises:
transmitting the SRS transmission to the base station the M number of times with reference to the indication information and according to a set of SRS parameters required when the UE aperiodically sends the SRS transmission and the SRS control information.

5. The method according to claim 1, wherein $s_i$ states in $2^{k_i}$ states represented by $k_i$ bits in the SRS control information intended for the UE are separately used to indicate $s_i$ sets of SRS parameters required when the UE aperiodically transmits the SRS transmission, and one of states other than the $s_i$ states in the $2^{k_i}$ states is used to instruct the UE to not send the SRS transmission, where $1 \leq s_i \leq 2^{k_i}-1$, and where $s_i$ is an integer; and
wherein the SRS control information indicates one of the $s_i$ sets of SRS parameters or the UE to not send the SRS transmission.

6. The method according to claim 1, wherein a first value of $k_i$ corresponding to a first value of i differs from a second value of $k_i$ corresponding to a second value of i.

7. The method according to claim 1, wherein a value of $k_i$ depends on a value of i.

8. The method according to claim 1, wherein the DCI further carries uplink power control information for each of the Y number of UEs.

9. An apparatus, comprising:
a memory configured to store instructions; and
a processor coupled to the memory, with the processor configured to execute the instructions to cause the apparatus to perform:
receiving a downlink control information (DCI) from a base station by detecting that a cyclic redundancy check (CRC) of the DCI has been scrambled using a radio network temporary identifier (RNTI) received from the base station; wherein the DCI comprises sounding reference signal (SRS) control information intended for each user equipment (UE) of Y number of UEs, where Y is a positive integer greater than 1, where a bit quantity of the SRS control information intended for an $i^{th}$ UE in the Y number of UEs is $k_i$, where i is an integer according to the expression and where $k_i$ is a positive integer;
obtaining an SRS control information intended for a UE which the apparatus is or is used for from the DCI when the CRC of the DCI has been scrambled using the RNTI received from the base station; and
triggering an SRS transmission according to the SRS control information.

10. The apparatus according to claim 9, wherein the processor is further configured to execute instructions stored in the memory, to cause the apparatus to perform the following:
receiving an information about a bit location of the SRS control information from the base station through a first radio resource control (RRC) signaling, wherein the information about the bit location signals where the SRS control information is located in the DCI.

11. The apparatus according to claim 10, wherein the information about the bit location comprises an information about a start location.

12. The apparatus according to claim 9, wherein the processor is further configured to execute the instructions to cause the apparatus to perform:
receiving a third RRC signaling from the base station, the third RRC signaling carrying indication information, the indication information instructing the UE to transmit the SRS transmission for an M number of times while an aperiodic type of SRS transmission is triggered once, where M comprises a positive integer, and wherein the SRS transmission is the aperiodic type of SRS transmission; and
triggering the SRS transmission according to the SRS control information comprises:
transmitting the SRS transmission to the base station the M number of times with reference to the indication information and according to a set of SRS parameters required when the UE aperiodically sends the SRS transmission and the SRS control information.

13. The apparatus according to claim 9, wherein $s_i$ states in $2^{k_i}$ states represented by $k_i$ bits in the SRS control information intended for the UE are separately used to indicate $s_i$ sets of SRS parameters required when the UE aperiodically transmits the SRS transmission, and one of states other than the $s_i$ states in the $2^{k_i}$ states is used to instruct the UE to not send the SRS transmission, where $1 \leq s_i \leq 2^{k_i}-1$, and where $s_i$ is an integer; and
wherein the SRS control information indicates one of the $s_i$ sets of SRS parameters or the UE to not send an SR.

14. The apparatus according to claim 9, wherein a first value of $k_i$ corresponding to a first value of i differs from a second value of $k_i$ corresponding to a second value of i.

15. The apparatus according to claim 9, wherein a value of $k_i$ depends on a value of i.

16. The apparatus according to claim 9, the DCI further carries uplink power control information for each of the Y number of UEs.

17. A non-transitory storage medium configured to store instructions which, when executed by a processor, cause a user equipment (UE), which has the processor, to perform:
receiving a downlink control information (DCI) from a base station by detecting that a cyclic redundancy check (CRC) of the DCI has been scrambled using a radio network temporary identifier (RNTI) received from the base station; wherein the DCI comprises sounding reference signal (SRS) control information intended for each UE of Y number of UEs, where Y is a positive integer greater than 1, where a bit quantity of the SRS control information intended for an $i^{th}$ UE in the Y number of UEs is $k_i$, where i is an integer according to the expression $1 \leq i \leq Y$ and where $k_i$ is a positive integer;
obtaining an SRS control information intended for the UE from the DCI in response to the CRC of the DCI being scrambled using the RNTI received from the base station; and
triggering an SRS transmission according to the SRS control information.

18. The non-transitory storage medium according to claim 17, with the non-transitory storage medium further configured to store instructions, which, when executed by the processor, cause the UE to perform:
receiving an information about a bit location of the SRS control information from the base station through a first radio resource control (RRC) signaling, wherein the information about the bit location signals where the SRS control information is located in the DCI.

19. The non-transitory storage medium according to claim 17, wherein the DCI further carries uplink power control information for each of the Y number of UEs.

20. The non-transitory storage medium according to claim 17, wherein a value of $k_i$ depends on a value of i.

* * * * *

UNITED STATES PATENT AND TRADEMARK OFFICE
CERTIFICATE OF CORRECTION

PATENT NO.       : 10,771,220 B2
APPLICATION NO.  : 16/684176
DATED            : September 8, 2020
INVENTOR(S)      : Dou et al.

Page 1 of 1

It is certified that error appears in the above-identified patent and that said Letters Patent is hereby corrected as shown below:

In the Claims

Claim 13, Column 40, Line 14:
"to not send an SR"
Should read:
-- "to not send the SRS transmission" --.

Signed and Sealed this
Twentieth Day of October, 2020

Andrei Iancu
*Director of the United States Patent and Trademark Office*